(12) United States Patent
Weber et al.

(10) Patent No.: US 8,532,588 B1
(45) Date of Patent: Sep. 10, 2013

(54) APPARATUS FOR SIGNAL POWER LOSS REDUCTION IN RF COMMUNICATION SYSTEMS

(75) Inventors: David J. Weber, Santa Clara, CA (US); Manolis Terrovitis, Santa Clara, CA (US); David K. Su, Santa Clara, CA (US)

(73) Assignee: The Connectivity Patent Trust, San Diego, CA (US)

( * ) Notice: Subject to any disclaimer, the term of this patent is extended or adjusted under 35 U.S.C. 154(b) by 1600 days.

(21) Appl. No.: 11/690,784

(22) Filed: Mar. 23, 2007

Related U.S. Application Data

(63) Continuation-in-part of application No. 11/559,382, filed on Nov. 13, 2006, which is a continuation of application No. 10/217,699, filed on Aug. 13, 2002, now Pat. No. 7,212,788.

(51) Int. Cl.
*H04B 1/02* (2006.01)

(52) U.S. Cl.
USPC .......................... 455/101; 455/118

(58) Field of Classification Search
CPC ............................... H04B 7/0669; H03D 7/00
USPC .................. 455/101, 118, 91–129; 375/299, 375/347
See application file for complete search history.

(56) References Cited

U.S. PATENT DOCUMENTS

| | | | |
|---|---|---|---|
| 4,736,455 A * | 4/1988 | Matsue et al. | 455/138 |
| 5,274,836 A * | 12/1993 | Lux | 455/1 |
| 5,276,915 A | 1/1994 | Marko et al. | |
| 5,805,643 A * | 9/1998 | Seki et al. | 375/347 |
| 5,812,605 A * | 9/1998 | Smith et al. | 375/308 |
| 5,991,344 A | 11/1999 | Fujii et al. | |
| 6,088,570 A | 7/2000 | Komara et al. | |
| 6,108,526 A | 8/2000 | van der Plas | |
| 6,163,681 A | 12/2000 | Wright et al. | |
| 6,172,970 B1 * | 1/2001 | Ling et al. | 370/347 |
| 6,175,747 B1 | 1/2001 | Tanishima et al. | |
| 6,226,508 B1 | 5/2001 | Takahashi et al. | |
| 6,330,433 B1 | 12/2001 | Jager | |
| 6,385,439 B1 | 5/2002 | Hellberg | |
| 6,477,148 B1 | 11/2002 | Gardenfors et al. | |
| 6,584,304 B1 | 6/2003 | Thomsen et al. | |
| 6,751,470 B1 | 6/2004 | Ella et al. | |
| 7,110,381 B1 | 9/2006 | O'Sullivan et al. | |
| 7,113,748 B2 | 9/2006 | Shapira et al. | |
| 7,194,286 B2 * | 3/2007 | Lozano et al. | 455/562.1 |
| 7,212,788 B2 | 5/2007 | Weber et al. | |
| 7,260,418 B2 * | 8/2007 | Natarajan et al. | 455/562.1 |
| 7,398,067 B2 * | 7/2008 | Wolf | 455/137 |
| 7,636,344 B2 | 12/2009 | O'Sullivan et al. | |
| 7,738,608 B2 * | 6/2010 | Feher | 375/347 |
| 2001/0024450 A1 | 9/2001 | Takalo et al. | |
| 2001/0025996 A1 | 10/2001 | Hosokawa | |
| 2001/0051512 A1 | 12/2001 | Wilson et al. | |
| 2002/0024375 A1 | 2/2002 | Asano et al. | |
| 2002/0055345 A1 | 5/2002 | Wood, Jr. | |
| 2003/0050032 A1 | 3/2003 | Masaki | |

(Continued)

*Primary Examiner* — Lana N Le
(74) *Attorney, Agent, or Firm* — Paradigm IP Law, PC; Ross L. Franks

(57) ABSTRACT

Redundancies of power amplifiers (PAs) or low noise amplifiers (LNAs) at the front end of an RF device are used to reduce losses that typically occur at a diversity switch. A signal designator can advantageously be used to select designated signals, which are provided to the PAs for transmitting or provided by the LNAs during receiving.

3 Claims, 21 Drawing Sheets

(56) References Cited

U.S. PATENT DOCUMENTS

| | | |
|---|---|---|
| 2003/0073916 A1 | 4/2003 | Yonce |
| 2003/0134601 A1 | 7/2003 | Jou |
| 2003/0174079 A1 | 9/2003 | Soltanian et al. |
| 2003/0207668 A1 | 11/2003 | McFarland et al. |
| 2003/0214446 A1 | 11/2003 | Shehab |
| 2004/0204105 A1 | 10/2004 | Liang et al. |
| 2005/0085267 A1 | 4/2005 | Lemson et al. |
| 2007/0049348 A1 | 3/2007 | O'Sullivan et al. |
| 2007/0280185 A1 | 12/2007 | McFarland et al. |
| 2008/0159123 A1 | 7/2008 | Tehrani et al. |

* cited by examiner

APPARATUS FOR SIGNAL POWER LOSS REDUCTION IN RF COMMUNICATION SYSTEMS

RELATED APPLICATIONS

This application is a continuation-in-part of U.S. patent application Ser. No. 11/559,382, entitled "Method And Apparatus For Signal Power Loss Reduction In RF Communication Systems" filed Nov. 13, 2006, which is a continuation of U.S. patent application Ser. No. 10/217,699, entitled "Method And Apparatus For Signal Power Loss Reduction In RF Communication Systems" filed Aug. 13, 2002.

BACKGROUND OF THE INVENTION

1. Field of Invention

The present invention relates to reduction of signal power loss in communications systems. The invention is more particularly related to the reduction of signal power loss in wireless RF systems. In addition, the invention relates to implementing antenna diversity in wireless systems.

2. Related Art

The use of multiple antennas has become a popular method of improving performance of wireless devices. A simple technique is called "switch diversity" in which a radio can alternatively transmit and receive through separate antennas using only one antenna at a time. The radio can decide which antenna to use based upon the success of previous communications. FIG. 1 is a diagram of a conventional, switch diversity architecture. A pair of antennas, Antenna A and Antenna B (diversity antennas 100), are located at diverse physical locations and/or are antennas having diverse physical properties (gain, directivity, etc.). The diversity antennas 100 are connected to a diversity switch 110 that connects the antennas to a transmit/receive switch 120. When transmitting, a baseband/mixers device 140 feeds a signal to a power amplifier (PA) 132 in RF front end 130. The transmit/receive switch 120 directs the amplified signal to the diversity switch 110, which in turn directs the amplified transmit signal to a selected one of the diversity antennas. When receiving a reverse signal flow occurs, except that the received signal is boosted by a low noise amplifier (LNA) 134 prior to being received by the baseband/mixers device 140.

The diversity switch 110 is controlled by software or other electronics that selects one of the diversity antennas for reception/transmission. Selection criteria are typically based on quality of signal, e.g. S/N ratio and/or other identifiers, such as packet reception errors, etc. For example, a typical arrangement would call for the baseband/mixers device 140 to include some processing or algorithm that activates a control signal to perform the switching. The processing could include receiving packets on each of the antennas for a length of time (or number of packets), and then comparing the number of packet errors received by each of the antennas. The antenna with the least number of errors or the highest S/N ratio could then be selected for broadcast/reception. Once an antenna is selected, transmission/reception continues on the selected antenna. Periodically, the other antenna(s) could be re-tested. In the event a re-test indicates an environment change or other factor is degrading performance of the selected antenna compared to the other antenna(s), the selected antenna is changed to the then best performing antenna.

SUMMARY OF THE INVENTION

Various inefficiencies, particularly signal losses, can occur through standard diversity and transmit/receive architectures. One problem is the loss incurred through the diversity and transmit/receive switches. Specifically, the switches attenuate the RF signal and introduce noise, which degrades the performance of the power amplifier (PA) and the low noise amplifier (LNA) when measured from the antenna port. Certain improvements in wireless signal reception, particularly when applied to antenna diversity architectures and transmit/receive architectures are provided herein.

The present invention provides redundancies at the front end of an RF device. These redundancies can advantageously reduce losses that typically occur at a diversity switch. In highly integrated radio systems, silicon area is inexpensive and the cost of redundancy is low. The losses incurred by the diversity switches can be reduced by duplicating the number of PAs/LNAs. A signal designator can advantageously be used in the front end to select designated signals, which are provided to the PAs for transmitting or provided by the LNAs during receiving.

In one embodiment, an RF front end of a receive chain can include a plurality of LNAs, wherein each LNA can receive RF signals from a dedicated antenna. A signal designator can receive amplified signals from the plurality of LNAs and select designated output signals. Each set of a plurality of sets of mixers can receive a designated output signal from the signal designator and a local oscillator (LO) signal (including I and Q components). Each adder of a plurality of adders can receive a mixed signal from each set of mixers and generate a baseband signal having an I component or Q component.

In one embodiment, where the plurality of sets of mixers are first and second sets of mixers, the first set of mixers can receive a first designated output signal and the LO signal including I and Q components, and the second set of mixers can receive a second designated output signal and the LO signal including −I and Q components.

Where the plurality of adders are first and second adders, the first adder can receive a first mixed signal resulting from mixing the first designated output and the I component of the LO signal and a second mixed signal resulting from mixing the second designated output and the Q component of the LO signal. The second adder can receive a third mixed signal resulting from mixing the first designated output and the Q component of the LO signal and a fourth mixed signal resulting from mixing the second designated output and the −I component of the LO signal.

An RF front end of a transmit chain can include a splitter that receives an input signal for transmission. Each mixer of a plurality of mixers can receive the splitter output signal and a local oscillator signal. A signal designator can receive mixed signals from the plurality of mixers and select designated output signals. Each PA of a plurality of PAs can receive a designated output signal from the signal designator. Each antenna port of a plurality of antenna ports can receive an amplified signal from one of the plurality of PAs. For two mixers, a first mixer can receive an I component of the LO signal and a second mixer can receive a Q component of the LO signal. In one embodiment, the splitter includes a wired connection.

An RF front end of a transmit chain providing direct conversion can include a plurality of sets of mixers, wherein each mixer set can receive I and Q components of an input signal and the LO signal. Each adder of a plurality of adders can receive inputs from one set of mixers. A signal designator can receive summed signals from the plurality of adders and selecting designated output signals. Each PA of a plurality of PAs can receive a designated output signal from the signal designator. Each antenna port of a plurality of antenna ports can receive an amplified signal from one of the plurality of PAs.

Where the plurality of sets of mixers are first and second sets of mixers, the first set of mixers can receive an I component and a Q component of the LO signal and the second set of mixers can receive an −I component and the Q component of the LO signal. Where the plurality of adders are first and second adders, the first adder can receive a first mixed signal resulting from mixing an I component of the input signal and the I component of the LO signal and a second mixed signal resulting from mixing a Q component of the input signal and the Q component of the LO signal. The second adder can receive a third mixed signal resulting from mixing the I component of the input signal and the Q component of the LO signal and a fourth mixed signal resulting from mixing the Q component of the input signal and an −I component of the LO signal.

Portions of the RF front end may be conveniently implemented in programming, data sequences, and/or control signals executed or generated on a general purpose computer. Any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings. Like reference numerals in the drawings designate identical or corresponding parts.

DETAILED DESCRIPTION OF THE FIGURES

Figure 1:
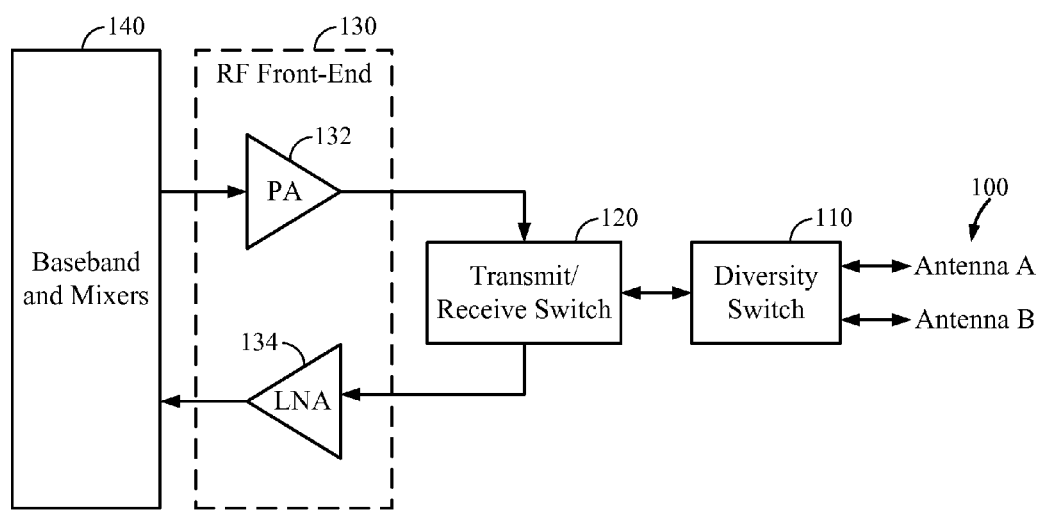
FIG. 1 is a block diagram of a conventional, switch diversity antenna architecture.
Figure 2:
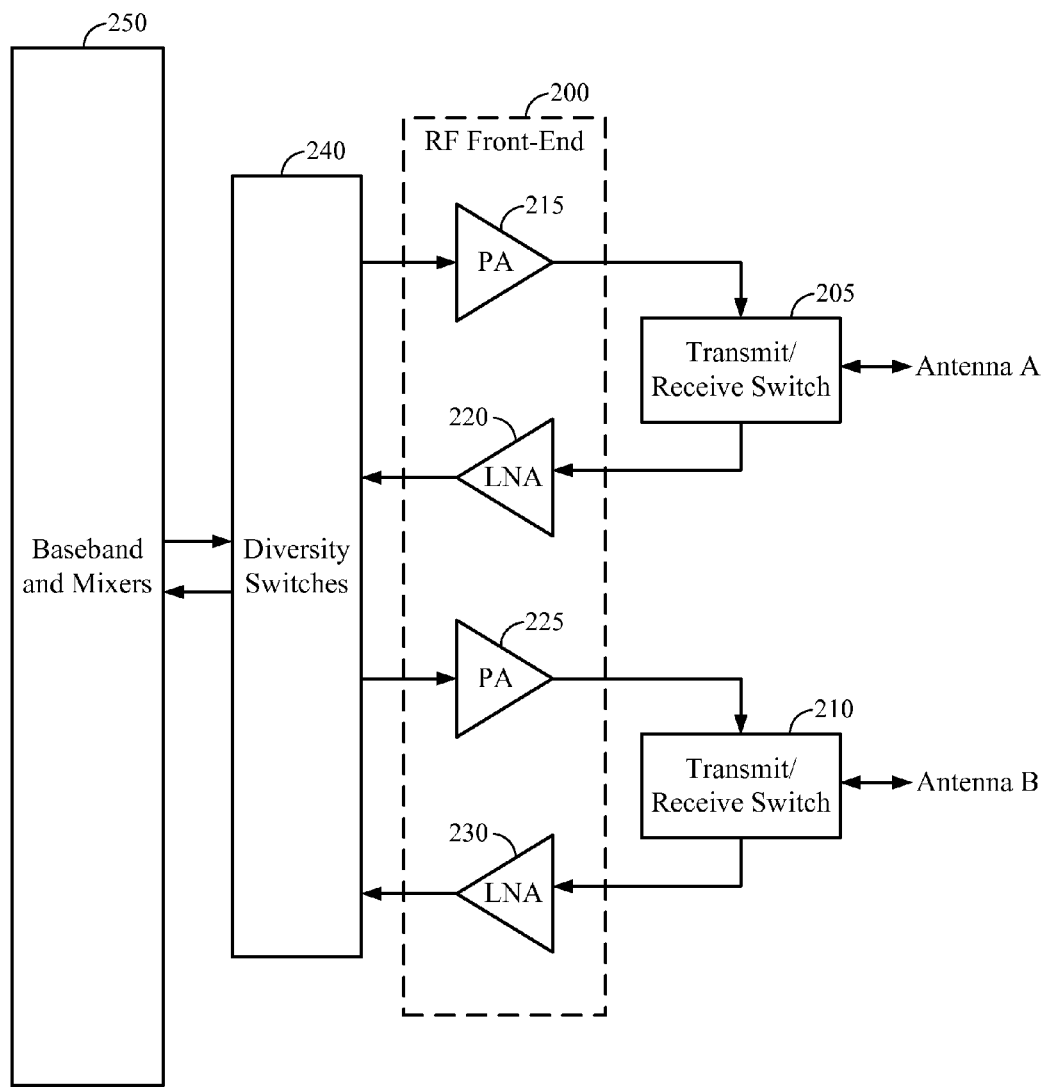
FIG. 2 is a block diagram of a redundant front end architecture in a diversity antenna device according to an embodiment of the present invention.

FIG. 2 illustrates a block diagram of a redundant front end architecture in a diversity antenna device according to an embodiment of the present invention. The illustrated embodiment provides a framework from which signal losses incurred due to a diversity switch can be reduced.

The signal affected most by inefficiencies, and therefore presenting the greatest design challenge is the signal as it is transmitted to and received from the antenna. For example, a signal received at antenna A can be directed by a transmit/receive switch 205 to a low noise amplifier (LNA) 220. In the previous designs, a diversity switch was also included in the signal path from the antennas to the LNA. However, in accordance with the invention, RF front end 200 has an architecture that uses redundant front end components, thereby eliminating the need for a diversity switch between the front end and the antennas.

In FIG. 2, the baseband/mixer device 250 provides a signal to be transmitted. The signal to be transmitted can be amplified as required to counteract any losses that occur at a diversity switch 240. The diversity switch 240 can send the signals to be transmitted to a power amplifier (PA) 215 or a PA 225. The diversity switch 240 is set to send the signal to be transmitted to PA 215 when Antenna A is the selected antenna for transmissions. Reversing that process, when receiving signals at antenna A (i.e. the selected receiving antenna), signals received can be routed through LNA 220 (where the signals are amplified), and then sent through diversity switch 240 to the baseband/mixer device 250. When the selected antenna is antenna B, similar processes occur except that the transmit signals are routed through PA 225 and received signals are routed through LNA 230.

Therefore, redundant architecture of RF front-end 200 implements a switch diversity scheme without the need for a diversity switch between the RF front-end and the antennas, thereby significantly improving system performance. That is, in this architecture, the diversity switching function is accomplished in a less performance critical section of the radio.

Moreover, power usage can be reduced by powering down the unused half of the RF front-end. For example, when transmitting or receiving on antenna A, PA 225 and LNA 230 can be powered down.

Notably, if the PA and LNA are integrated parts of a larger radio-on-a-chip, the incremental cost of the silicon area to duplicate the PA and LNA layouts is relatively small. The primary cost of this approach is the need to multiply the number of package pins required for the PA and LNA ports by the number of diversity antennas being implemented. The transmit/receive switches 205 and 210 can either be integrated or off-chip.

This architecture could also be used with discrete components for the PAs and LNAs, but the cost of discrete components could be prohibitive because of the need to buy multiple PA and LNA components. If discrete external components are necessary due to performance constraints, a modified version of the redundant diversity architecture allows for the use of a single external component.

Figure 3:
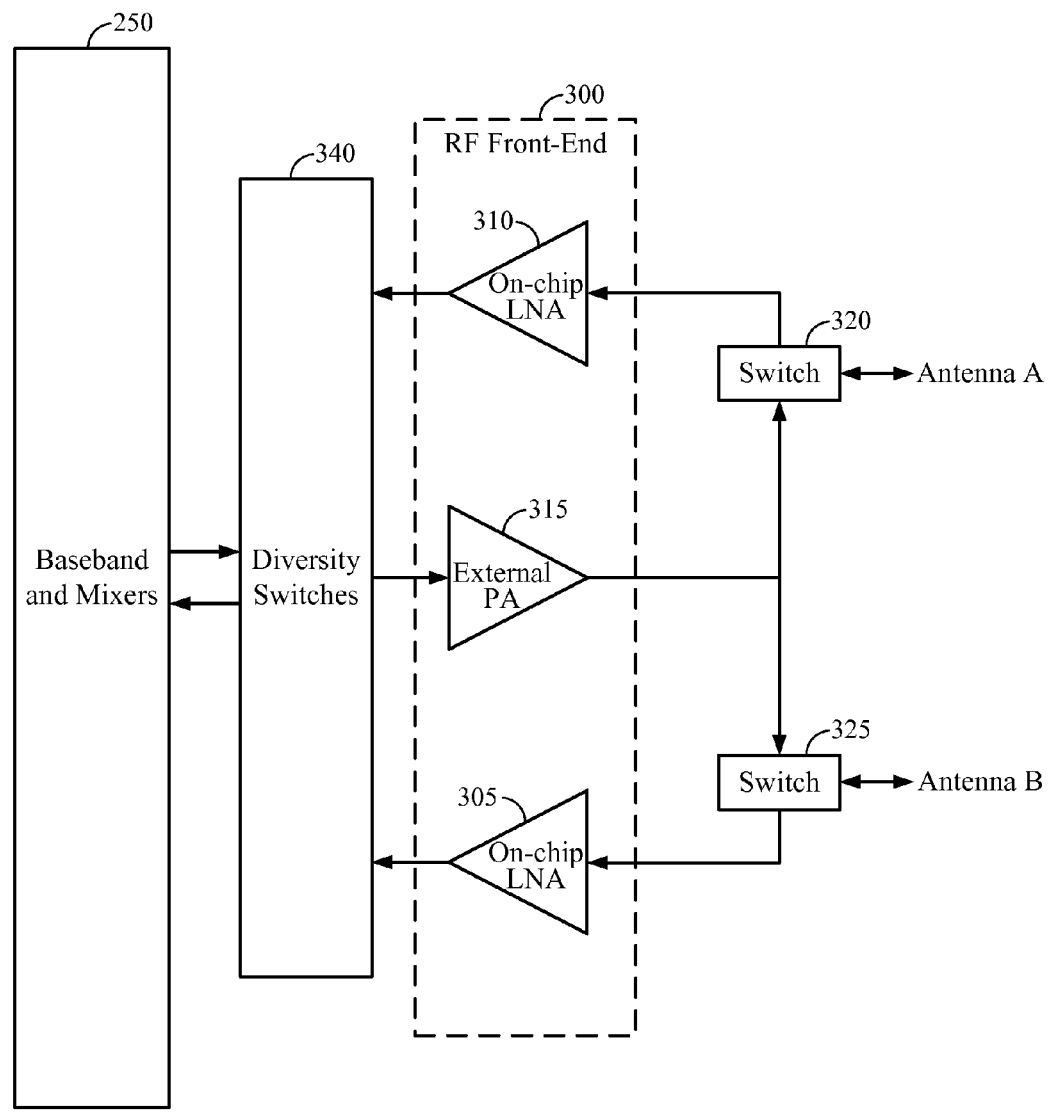
FIG. 3 is a block diagram of a half redundant front end in a diversity antenna device according to an embodiment of the present invention.

FIG. 3 is a block diagram of a half-redundant front-end 300 in a diversity antenna device according to another embodiment of the present invention. The half-redundant front-end 300 is connected to diversity switches 340. The diversity switches 340 direct incoming signals from either LNA 305 or LNA 310 (each on-chip devices) to the baseband/mixer device 250. Signals to be transmitted from the baseband/mixer device 250 are routed to an external PA 315. The external PA 315 then powers one of the antennas A and B in accordance with the setting of switches 320 and 325.

The half-redundant architecture of RF front-end 300 duplicates the layout of the on-chip components, mainly the LNA, where the incremental cost is small, while avoiding the cost of duplicating external components. In the example above, an external PA and a redundant LNA is used, but a similar architecture with a redundant PA and an external LNA could be used.

Using the half-redundant architecture, the performance of the external component may be compromised because of having to drive two switches (e.g. switches 320 and 325). The finite isolation of the switch that is off will allow some fraction of power to be diverted from the intended path. However, the use of an external component may provide enough power margin to overcome this loss. In the example above, the performance of the external PA may be compromised, but the loss from the antenna to the LNAs is still lower than a traditional architecture with a diversity switch between the RF front-end and the antennas.

In another embodiment, multiple LNA and/or PA devices are implemented on-chip, one dedicated to each antenna. More than one of these devices can operate at a given time, thereby enabling the simultaneous use of multiple antennas, or equivalently the use of one multi-element antenna.

Figure 4:
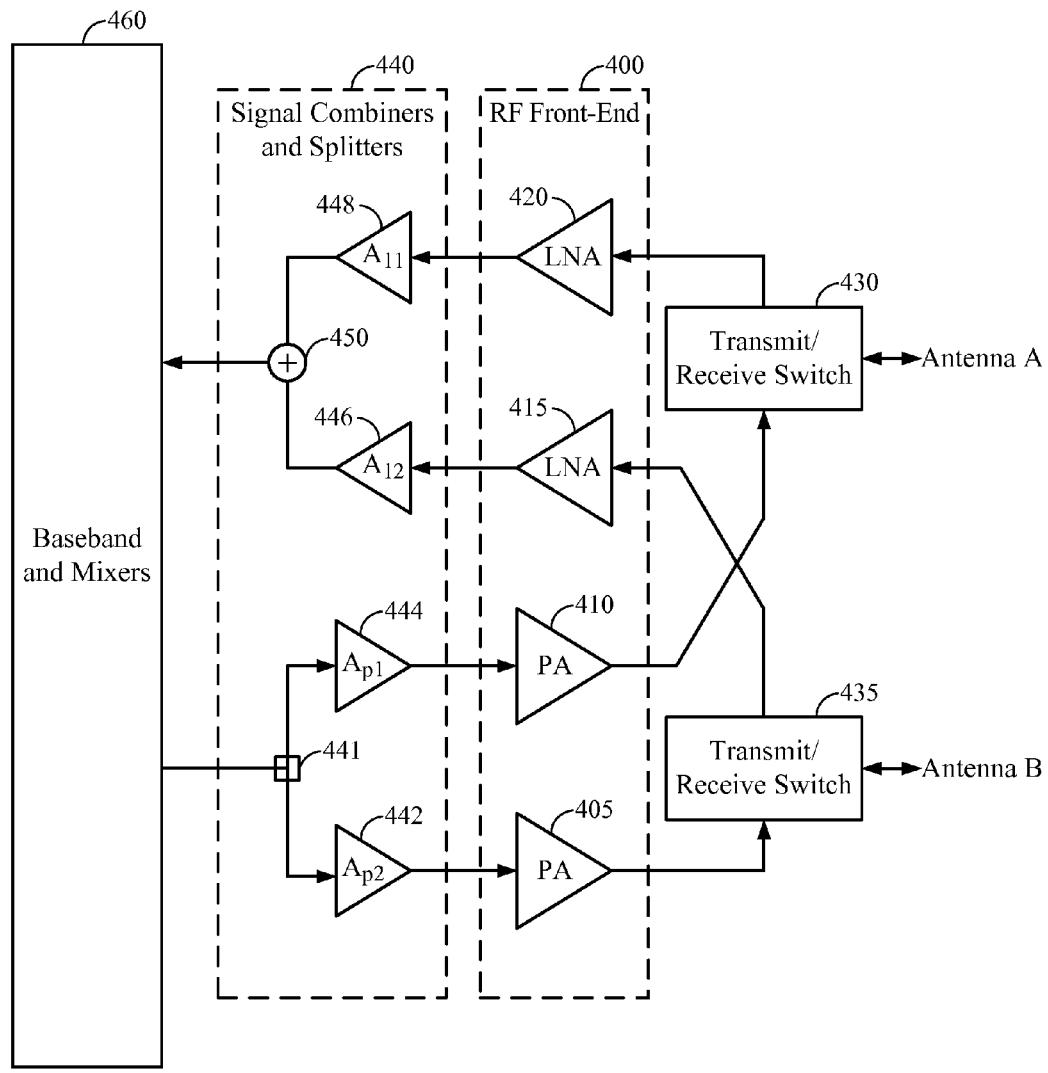
FIG. 4 is a block diagram of a beam forming architecture using multiple integrated PA and LNA blocks according to an embodiment of the present invention.

FIG. 4 is a block diagram of a beam forming architecture using multiple integrated PA and LNA blocks according to an embodiment of the present invention. In this embodiment, an RF front end 400 includes a PA 405 and an LNA 415 for antenna B and a PA 410 and an LNA 420 for antenna A. Although the figures presented herein mainly show two antennas, any number of antennas may be utilized. For example, in a beam forming embodiment, three or more antennas may be utilized, wherein each antenna has a designated LNA/PA set (preferably on-chip).

In this embodiment, each PA can feed a transmit/receive switch and a corresponding antenna. For example, PA 410 feeds transmit/receive switch 430 and antenna A, whereas PA 405 feeds transmit/receive switch 435 and antenna B.

An input signal to be transmitted from baseband/mixer device 460 can be split to feed each of the PAs. In a component-based implementation, a splitter 441 can be used to split the signal. In an integrated implementation, a shared line can be used.

One of PAs 405 and 410 is operational when the device is being operated in the single antenna mode, whereas both PAs 405 and 410 are operational when transmitting in a beam forming or multiple antenna mode. As noted above, additional PAs and corresponding antennas may be utilized and included in the beam forming or multiple antenna modes. Additionally, any PA can be shut down when its corresponding antenna is either being used for receiving or not utilized. Any number of combinations of transmitting, receiving, and/or unutilized PA and antenna combinations is possible to match any system requirements.

Each LNA is fed a received signal from one of the antennas through a corresponding transmit/receive switch. Outputs of the LNAs are combined at an adder 450 when the device is in a multiple antenna configuration. Any one or more LNA outputs may be excluded from the adder operation if that LNA/antenna are idle or when that LNA/antenna are being used in a transmit capacity.

Thus, in the embodiment of FIG. 4, the on-chip diversity switches discussed previously are replaced by appropriate signal combiners (e.g. adder 450) at the outputs of the LNAs and signal splitters which provide the inputs to the PAs. The properties and advantages of multi-element antennas are well documented in literature. By adjusting the phase with which the signals are combined from or split between the multiple antennas, the radiation diagram of the antennas (beam forming) can be adjusted and significantly improve the antenna gain towards the desired direction, with respect with what is achieved with a single antenna. The adjustment may be made by trial and error or based on an algorithm that tries different phase adjustments and extrapolates the results of the different phase adjustments to a best phase from which to combine the signals with. FIG. 4 provides a preferred configuration. Blocks $A_{f1}, A_{f2}, A_{p1}, A_{p2}$ (442-448) are programmable phase shifters. Using appropriate circuit techniques, these blocks can be implemented in a way that does not incur an appreciable cost in terms of performance degradation, power consumption, or silicon area. The implementation is facilitated if the phase shifters are capable to implement only a finite set of signal phase rotation (for example, 0°, 180°, and 90°) as opposed to implementing an arbitrary signal phase rotation which is also realizable. The finite number of phase rotations reduces performance with respect to an arbitrary phase rotation, but by only a small amount and reduces complexity and cost. The use of multiple LNAs and PAs does come at the price of increased power consumption, but it is possible that lower performance and lower power circuit blocks can be used and still benefit from the new architecture. Because the performance improvement provided by this technique might be enough to eliminate an external LNA or PA, this technique can be used to provide significant system power and form factor reduction.

To illustrate the benefit of this configuration in an integrated receiver consider, for example, that the signal is being received with the same power from the two antennas and its phase is adjusted in the blocks $A_{f1}$ and $A_{f2}$ such that the two signals add in phase. The signal level is then 6 dB higher than in the case that a single antenna is used. The noise received by the two antennas and introduced by the transmit/receive switches and all the circuitry in front of the combiners is uncorrelated in the two paths and the output of the combiner has 3 dB higher noise level than the LNA output in the single antenna case. Therefore, the SNR improvement is 3 dB. In addition, since the signal level is higher at the combiner output than in the single active LNA case, the noise contribution of the rest of the receiver chain (mixers and baseband) is lower.

On the transmitter side, consider an example where the two PAs are fed with equal amplitude signals, shifted in phase appropriately by blocks $A_{p1}$ and $A_{p2}$ such that the outputs of the two antennas add constructively in phase at the desired direction. Then the transmitted signal is 6 dB higher than in the single antenna case assuming that the input signal to the single PA is equal to the signal to each one of the multiple PAs. Since the amount of transmitted power at the desired direction is usually defined by the system requirements, we can reduce the signal power fed to each PA, with a significant linearity benefit with respect to the single PA case. Since each PA needs to transmit only the fourth of the power of the single PA case, the power consumption in the two PAs can be significantly lower than twice the power consumption in the single PA case.

As stated before, the on-chip diversity switches, as well as the signal combiners and splitters can be implemented on-chip in various efficient ways.

Figure 5:
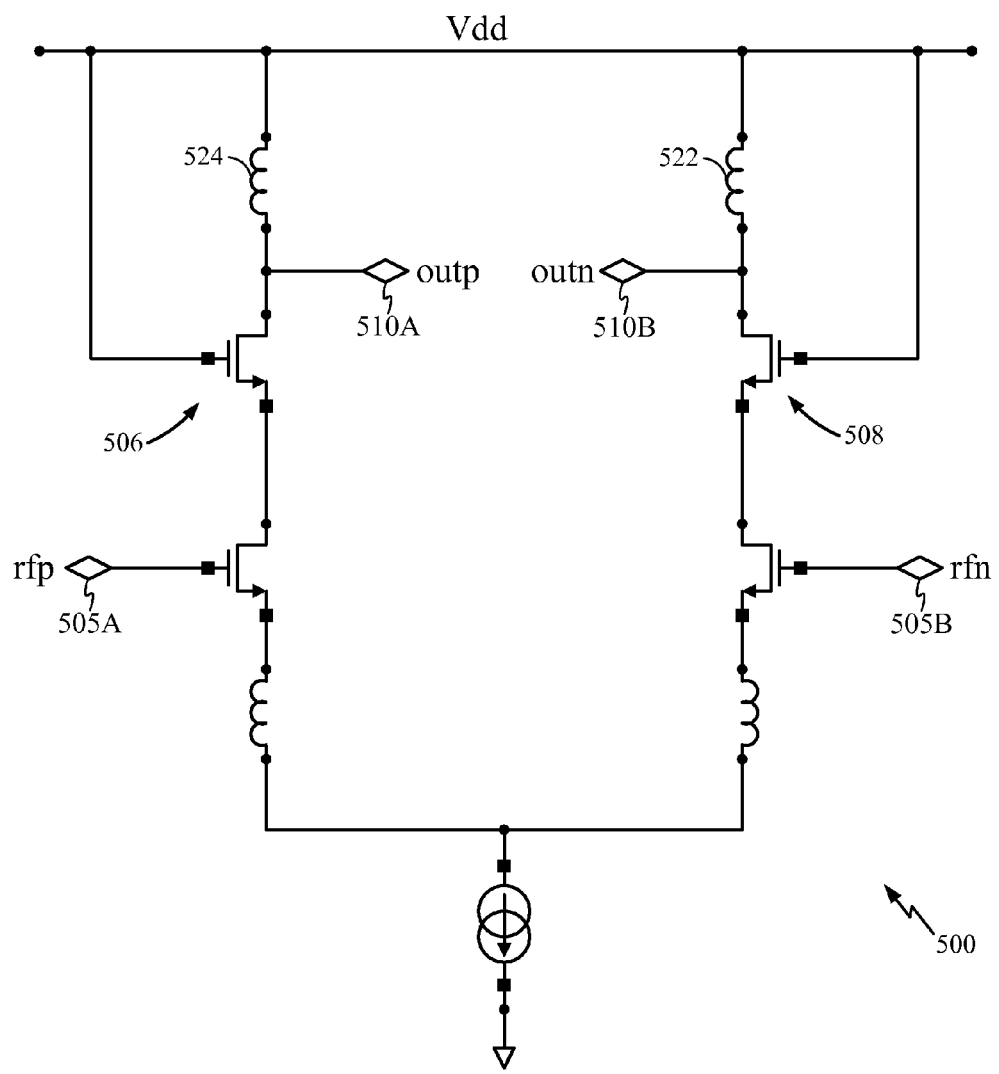
FIG. 5 is a circuit diagram of a conventional implementation of an on-chip LNA.

FIG. 5 is a circuit diagram of a conventional implementation of an on-chip LNA. LNA 500 includes cascode devices (e.g. 506/508) provide for reverse isolation and stability. The dual outputs 510A/510B, and dual inputs 505A and 505B indicate a differential design. Bias and other details are omitted to enhance clarity. As with all the circuit diagrams presented herein, values of specific components shown, if any, are merely exemplary.

Figure 6:
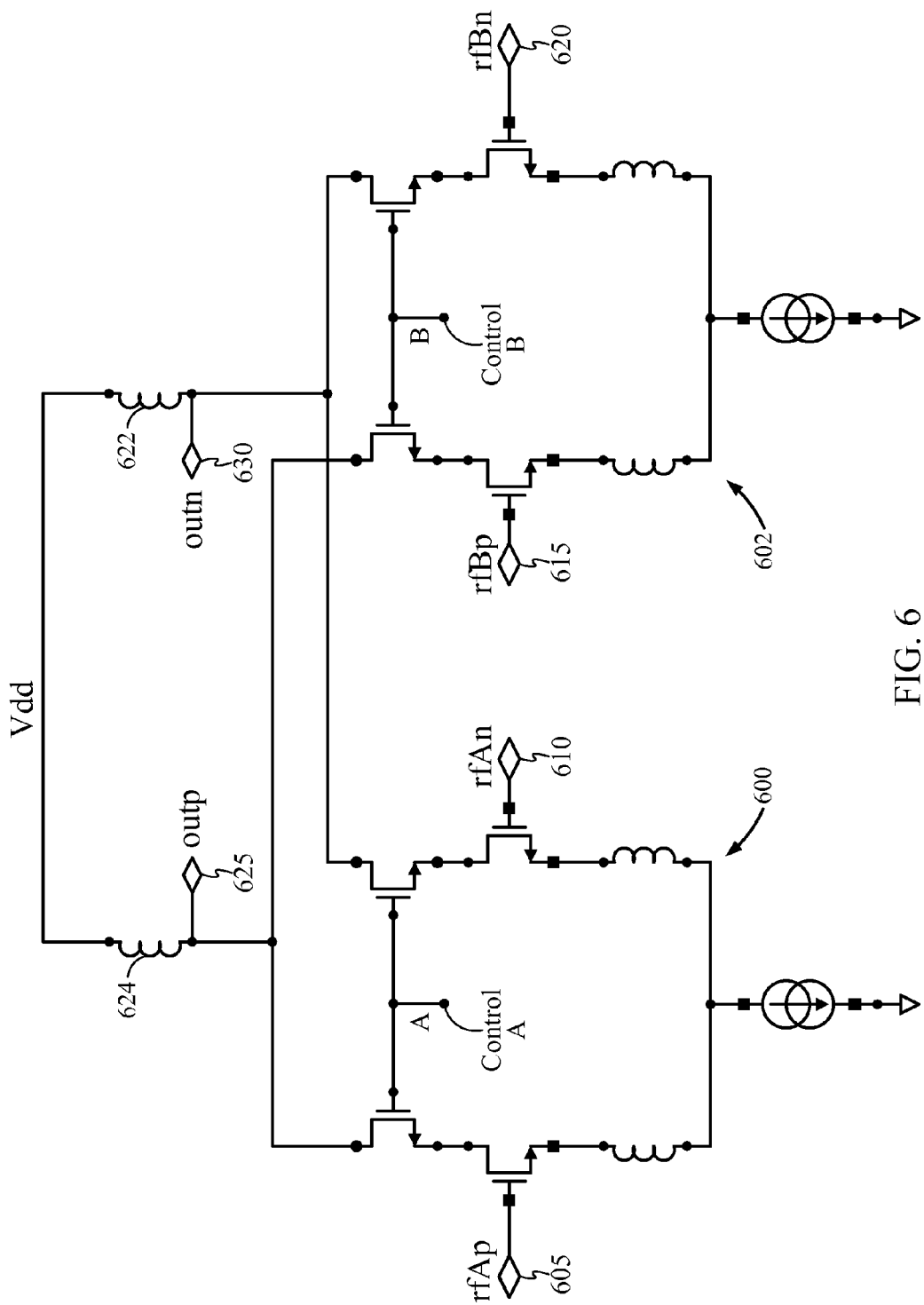
FIG. 6 is a circuit diagram of an example implementation of an on-chip LNA having switching pairs for steering current according to an embodiment of the present invention.

Diversity, as discussed with reference to FIGS. 2 and 3, can be achieved by using two of the LNAs described in FIG. 5 (or another LNA design) with a common pair of load inductors (e.g. 622/624—which are used for tuning the frequency to which the device is sensitive) as shown in FIG. 6. The gate voltages of the cascode devices can be controlled by logic signals control A and control B to turn off the LNA that needs to be disconnected (e.g. LNA 600 or LNA 602). For example, if LNA 600 was to be used, then Control B would be grounded, and the four transistors on the right, that constitute LNA 602, would effectively be eliminated. Preferably, LNA 600 is connected to a first antenna, and LNA 602 is connected to a second antenna. And, with the redundant amplifiers, the antennas are more directly connected to the amplifiers.

An implementation consistent with diversity as implemented in FIG. 6 has an additional advantage in that much less physical space is taken up than a design that simply made redundant LNAs. In the redundant LNA design of FIG. 5, the inductors (e.g. 522/524) take up more physical space than other parts of the circuit. Therefore, the redundant LNA uses more die space and has greater manufacturing cost. Since the inductors take up a large percentage of space even for a single LNA, a design consistent with FIG. 6 can be implemented on a die space nearly equivalent to the die space of a single LNA, but it is a dual LNA implementation.

Figure 7:
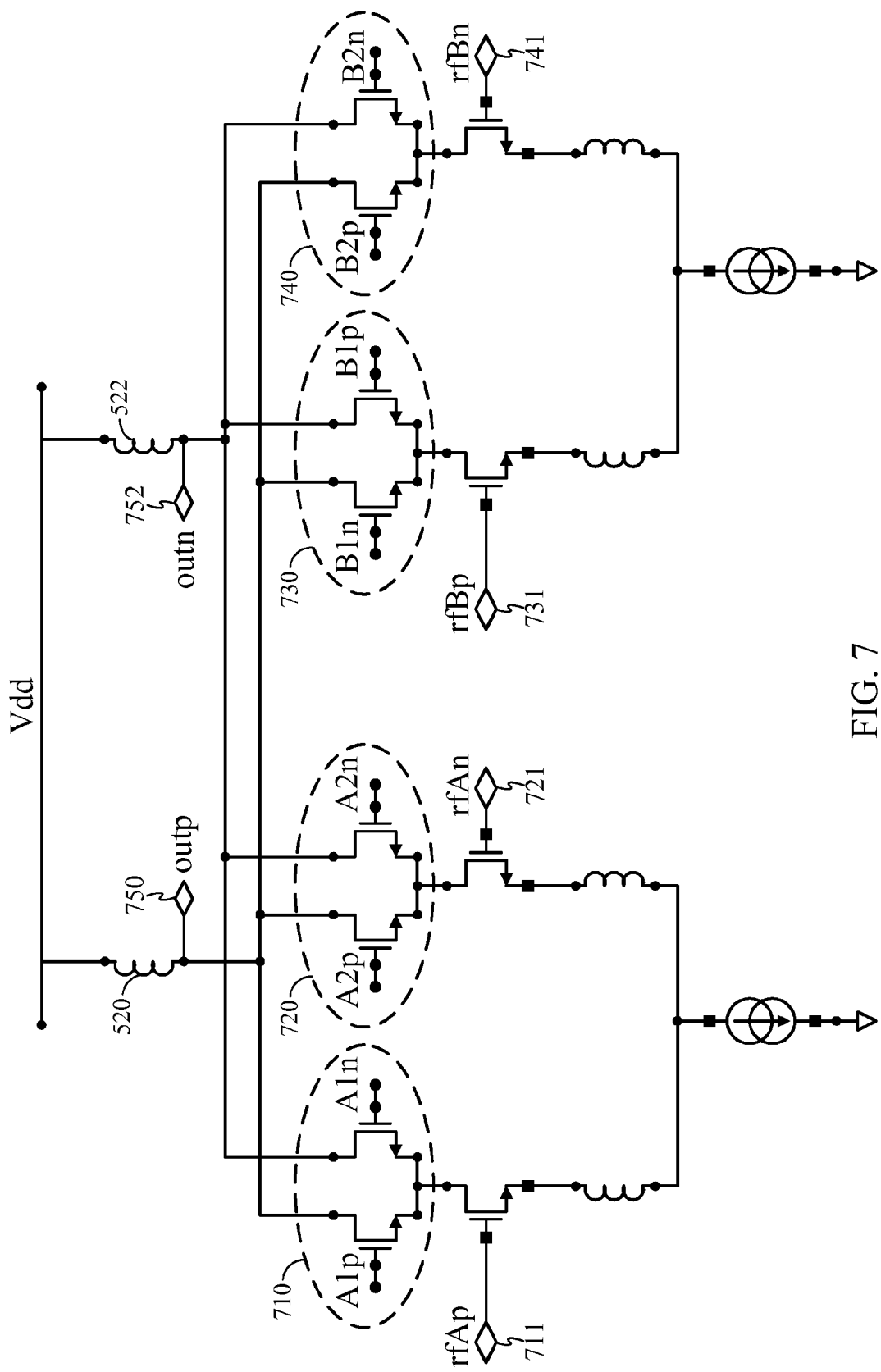
FIG. 7 is a circuit diagram of an example implementation of an on-chip amplifier that enables beam-forming according to an embodiment of the present invention.

FIG. 7 is a circuit diagram of an example implementation of an on-chip amplifier that enables beam-forming. The amplifier may be, for example, an LNA or a PA pre-driver. As illustrated in FIG. 7, diversity as well as beam-forming, as discussed with reference to FIG. 4, can be implemented by replacing the cascode devices with switching pairs (e.g. switching pairs 710, 720, 730, and 740) which can steer the current to the one or the other load inductor. By controlling the gates of the transistors of the switching pairs with logic signals (A1$p$, A1$n$, A2$n$, A2$p$, B1$n$, B1$p$, B1$p$, B1$n$) we can obtain the signal from either antenna A or antenna B alone, the sum of antenna A and antenna B, or the difference between antenna A and antenna B. By adding additional circuits, these properties may be propagated to triple, quad, or more antenna arrays.

For example, the current-steering amplifier topology of FIG. 7 can be used either as an LNA or as a PA driver, depending on how the inputs 711, 721, 731, and 741 and outputs 750 and 752 are connected. Control logic signals are attached to gates on switching pairs 710, 720, 730, and 740 (A1$p$, A1$n$, A2$n$, A2$p$, B1$n$, B1$p$, B1$p$, B1$n$). For an LNA, antennas are connected to gates at inputs 711, 721, 731, and 741, and receive mixers are connected to outputs 750 and 752. For a PA, transmit mixers are connected to gates at inputs 711, 721, 731, and 741, and antennas are connected to outputs 750 and 752.

A notable variation between FIG. 6 and FIG. 7 is that FIG. 6 provides two control (logic) signals so that either amplifier A (e.g. 600) is on or amplifier B (e.g. 602) is on. In FIG. 7, the switching pairs allow a summing operation. By manipulating the logic signals, the amplifiers may be configured only antenna A, only antenna B, A+B, or A−B. Now, since the antennas are to be located in different places, radiation patterns having peaks and valleys are formed (e.g. see FIG. 9). Depending on where a signal that a radio is trying to listen to, or, in the case of a transmitter, where a transmitter is trying to transmit to, there will be an optimum combination that provides the best communications link.

For example, in terms of a receiver, depending on where the transmitting station is, the receiver may get the clearest reception by subtracting the two signals received from the different antennas, or by adding them. In one embodiment, the present invention includes a processing device that tries different combinations of A, B, A+B, A−B, etc., and then determines which combination/single antenna gives the best reception, and then that combination is used for the remaining transmission. In one embodiment, the selected antenna combination is periodically updated.

The penalty introduced by the implementation of FIG. 7 is the small gain reduction of each LNA with respect to the single antenna implementation, because of the parasitic capacitance introduced by all the cascode devices and the lower load inductor value required to resonate it. However, the benefits are considerable and, in most applications, easily justify this small gain reduction In one embodiment, not shown in FIG. 7, to mitigate the gain reduction penalty, the switching pairs of one of the two LNAs are replaced with single cascode devices, since it suffices to be able to change the sign of the signal of one of the two LNAs only. Some asymmetry between the two paths may be introduced, but that disadvantage may be outweighed by the mitigating effects.

Figure 8:
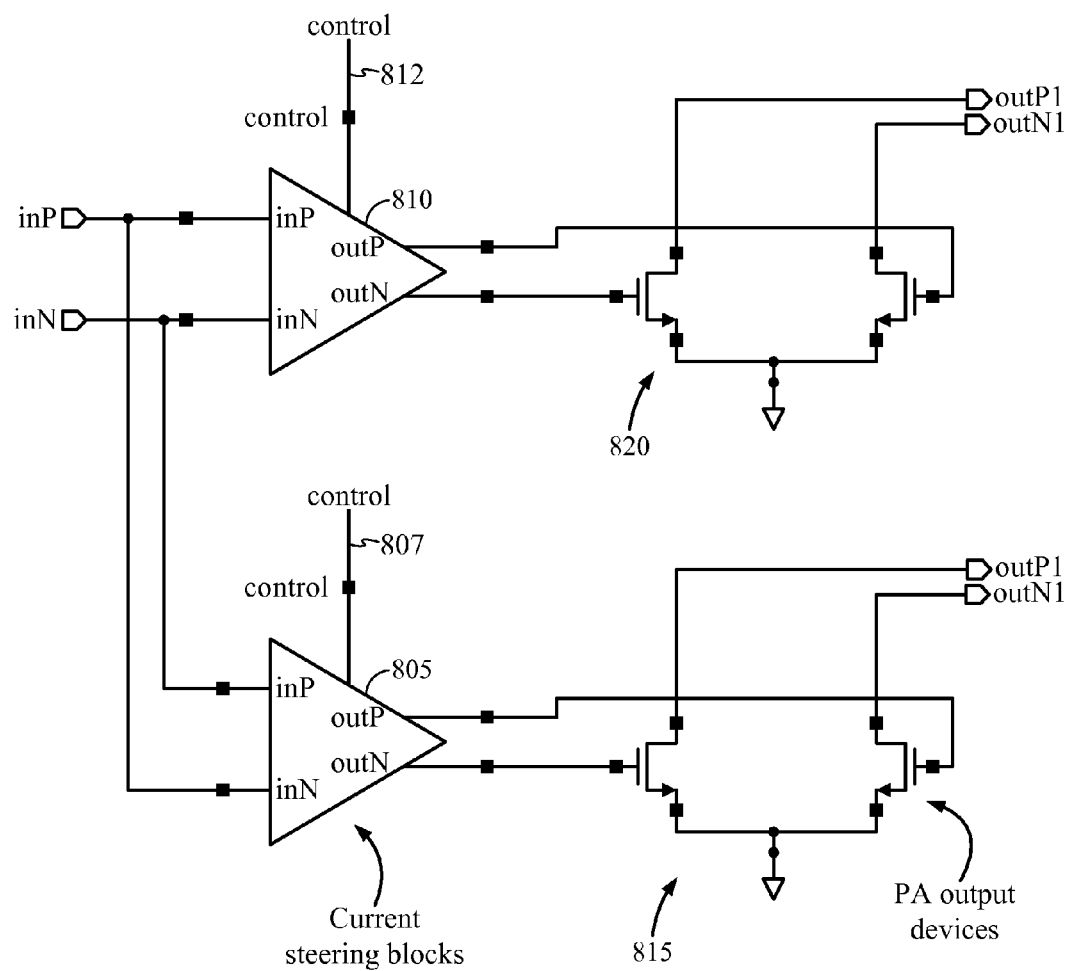
FIG. 8 is a circuit diagram of an example implementation of a beam-forming PA according to an embodiment of the present invention.

An implementation of a redundant PA to implement switch diversity would be to duplicate the PA layout, drive the PAs in parallel, and power down the amplifier driving the unused antenna. Implementing beam steering requires more complexity compared to the LNA case, as current steering devices in the output stage would reduce the amount of voltage that can be delivered to the antenna which in turn would reduce the PA efficiency. FIG. 8 proposes an alternate transmitter implementation where two sets of current steering drivers (similar to FIG. 7) 805 and 810 are used to drive two output stages 815 and 820. The control bits (807 and 812) to the drivers direct the TX signal paths to be driven in phase or complementary, or alternatively, the control bits can power down one PA or the other.

Figure 9:
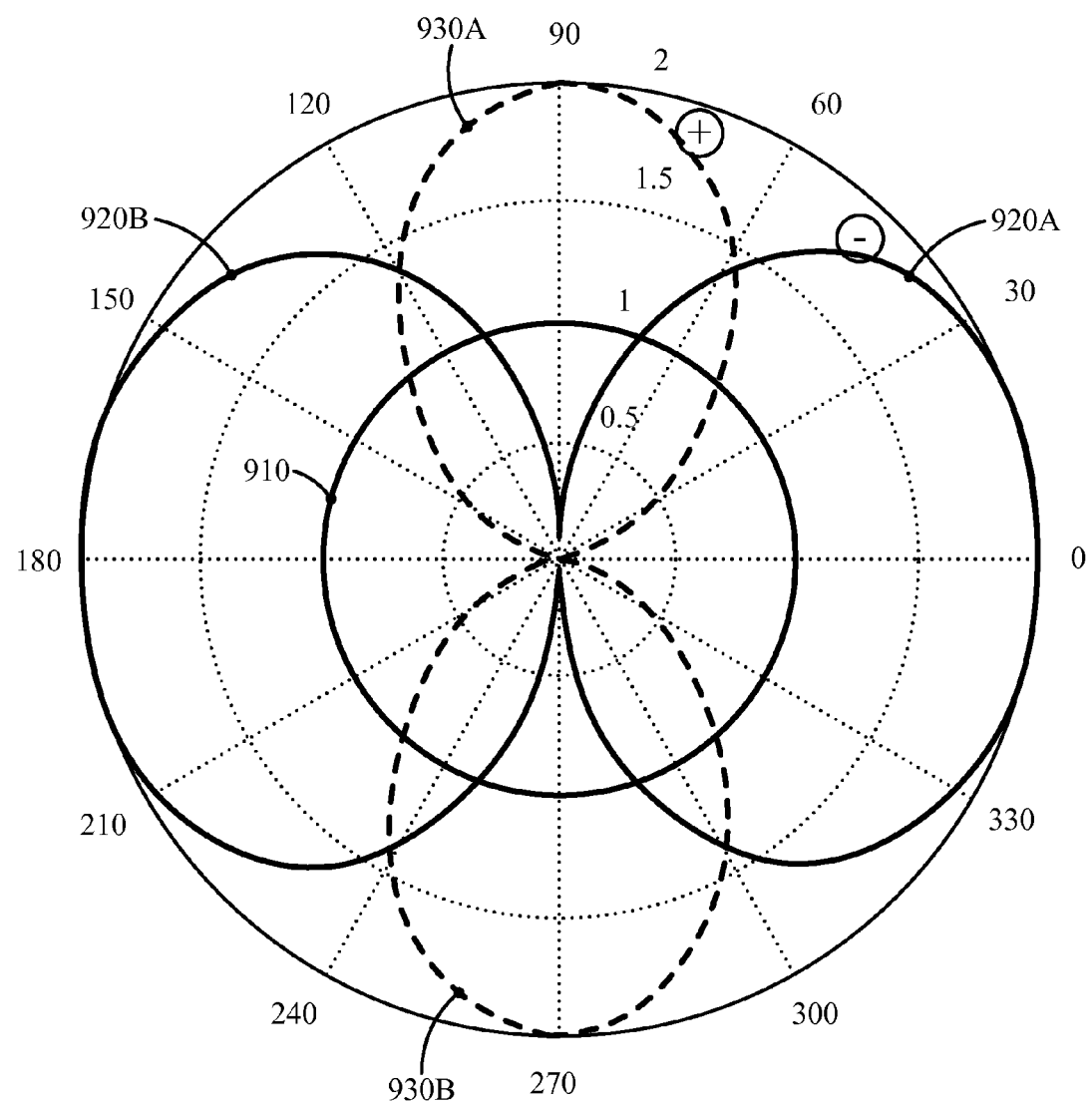
FIG. 9 is a graph of example antenna radiation patterns resulting from the circuit of FIG. 8.

FIG. 9 is a graph of example antenna radiation patterns resulting from the circuit of FIG. 8. In FIG. 9, the radiation pattern is shown for a single antenna, pattern 910 (e.g. antenna A or antenna B transmitting alone). The difference of antenna A and antenna B is shown as patterns 920A and 920B, and the sum of antenna A and antenna B is shown as patterns 930A and 930B.

The phase shifting techniques presented above in FIG. 6 and FIG. 7 is configured to shift the signal 0 or 180 degrees. However, referring back to FIG. 4, an implementation with programmable phase shifters can implement additional or programmable phase shifts of the antenna radiation pattern. Other phase shifting techniques may also be utilized.

Figure 13A:
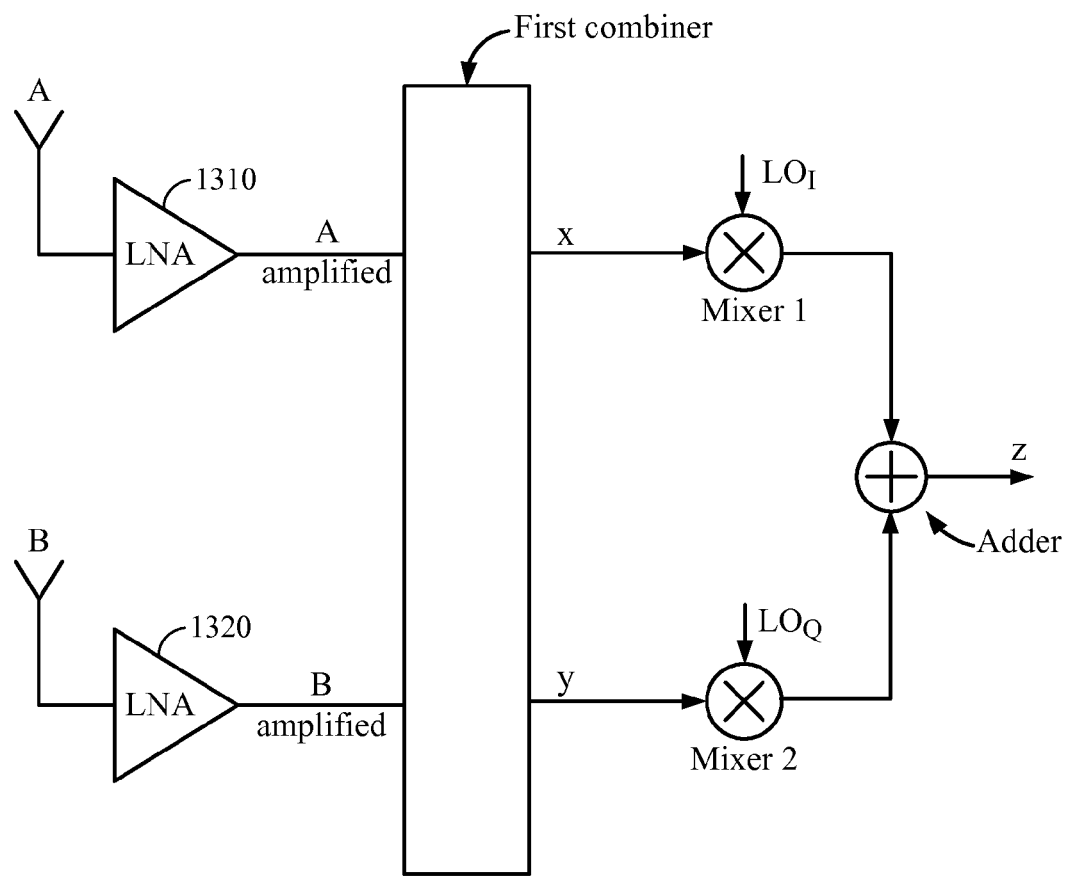
FIG. 13A provides an example implementation of beam forming by signal phase shifting according to an embodiment of the present invention.

For example, the present invention provides a higher degree of phase shift programmability by replicating a larger part of receive and transmit chains instead of the LNAs and/or PAs only. Phase shift by 90 degrees can be achieved by shifting a local oscillator (LO) signal that drives a mixer by 90 degrees. The I and Q components of the LO signal are often available on-chip and are utilized in this manner to implement a signal phase shift by 90 degrees. FIG. 13A provides an example implementation of received signal phase shifting by 0°, 90°, and 180° according to an embodiment of the present invention. Antenna A and antenna B each feed received signals to corresponding LNAs 1310 and 1320. The amplified signals are combined by a first combiner to produce combined signals x and y, which are described as:

(x, y), {(A,0), (B,0), (A+B, 0), (−A+B, 0), (A,B), (−A,B)}

Figure 13B:
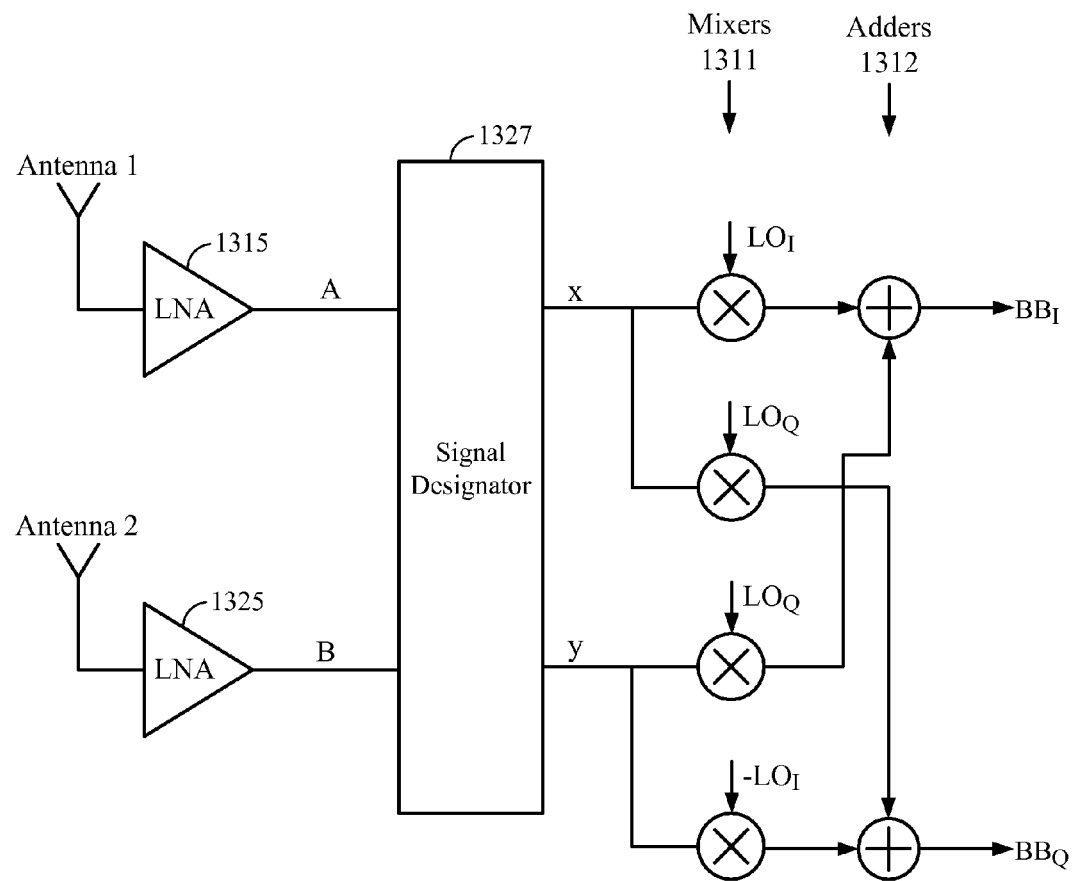
FIG. 13B illustrates an exemplary receive chain modified for direct conversion.

Therefore, x can be either A, −A, B, A+B, or −A+B, and y can be B or 0. Mixer 1 multiplies x with a signal $LO_I$ (I component of a local oscillator), and mixer 2 multiplies y with a signal $LO_Q$ (Q component of the local oscillator). The $LO_I$ and $LO_Q$ signals are 90° out of phase. Adder 1350 then combines each of the x and y phase shifted signals to a combined phase shifted signal z. The signal z is described as:

z∈{A,B, +/−A+B, +/−A+jB}, where $j^2$=−1, and it is also noted that the signal jB represents the B amplified signal rotated by 90°. Furthermore, in this implementation, it is also noted that mixer M2 only needs to be powered on when it is desired to obtain z=+/−A+jB because all the other combinations are obtainable via combiner 1330. FIG. 13B illustrates an exemplary receive chain modified for direct conversion. In this embodiment, LNAs 1315 and 1325 receive RF signals on antennas 1 and 2, respectively. Signal designator 1327 (also called a combiner above) receives the amplified RF signals A and B, which were output by LNAs 1315 and 1325, and provides selected signals (or combinations thereof) (i.e. signals x and y) to mixers 1311. The x output signal is mixed with the local oscillator signals $LO_I$ and $LO_Q$, whereas the y output signal is mixed with $-LO_I$ and $LO_Q$. At this point, adders 1312 can be used to sum the mixed signals as shown in FIG. 3B to form baseband signals $BB_I$ and $BB_Q$.

Figure 13C:
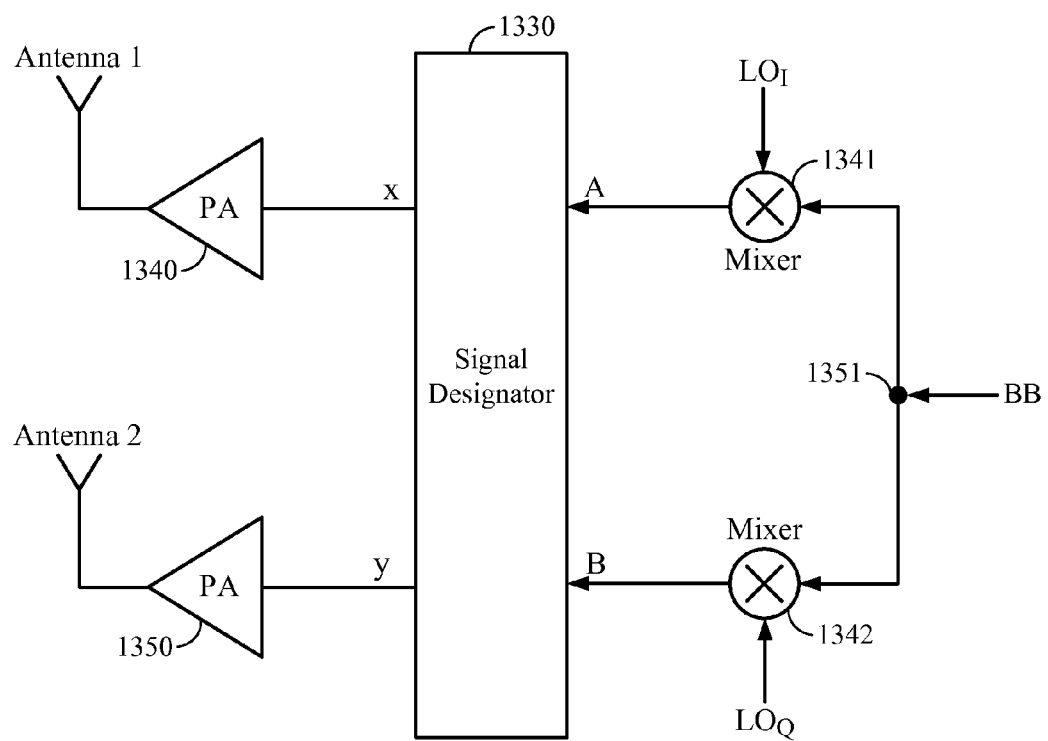
FIG. 13C provides an example implementation of beam splitting according to an embodiment of the present invention.

Although FIG. 13A is directed to receiving signals, the same basic architecture described in FIG. 13A may be applied to a transmit chain where signals are split and phase shifted prior to transmission. For example, FIG. 13C illustrates an exemplary transmit chain in which a splitter 1351 provides a baseband signal BB to both mixers 1341 and 1342, which also receive local oscillator signals $LO_I$ and $LO_Q$, respectively. The mixed signals A and B are provided to signal designator 1330, which in turn provides selected signals x and y to PAs 1340 and 1350, respectively. After amplification, PAs 1340 and 1350 provide their outputs to antennas 1 and 2, respectively, for transmission. In one embodiment, mixers 1341 and 1342 can be implemented with quadrature mixers to generate RF signals that are 90° apart. Moreover, splitter 1351 can be implemented using, for example, a wired connection on chip.

Figure 13D:
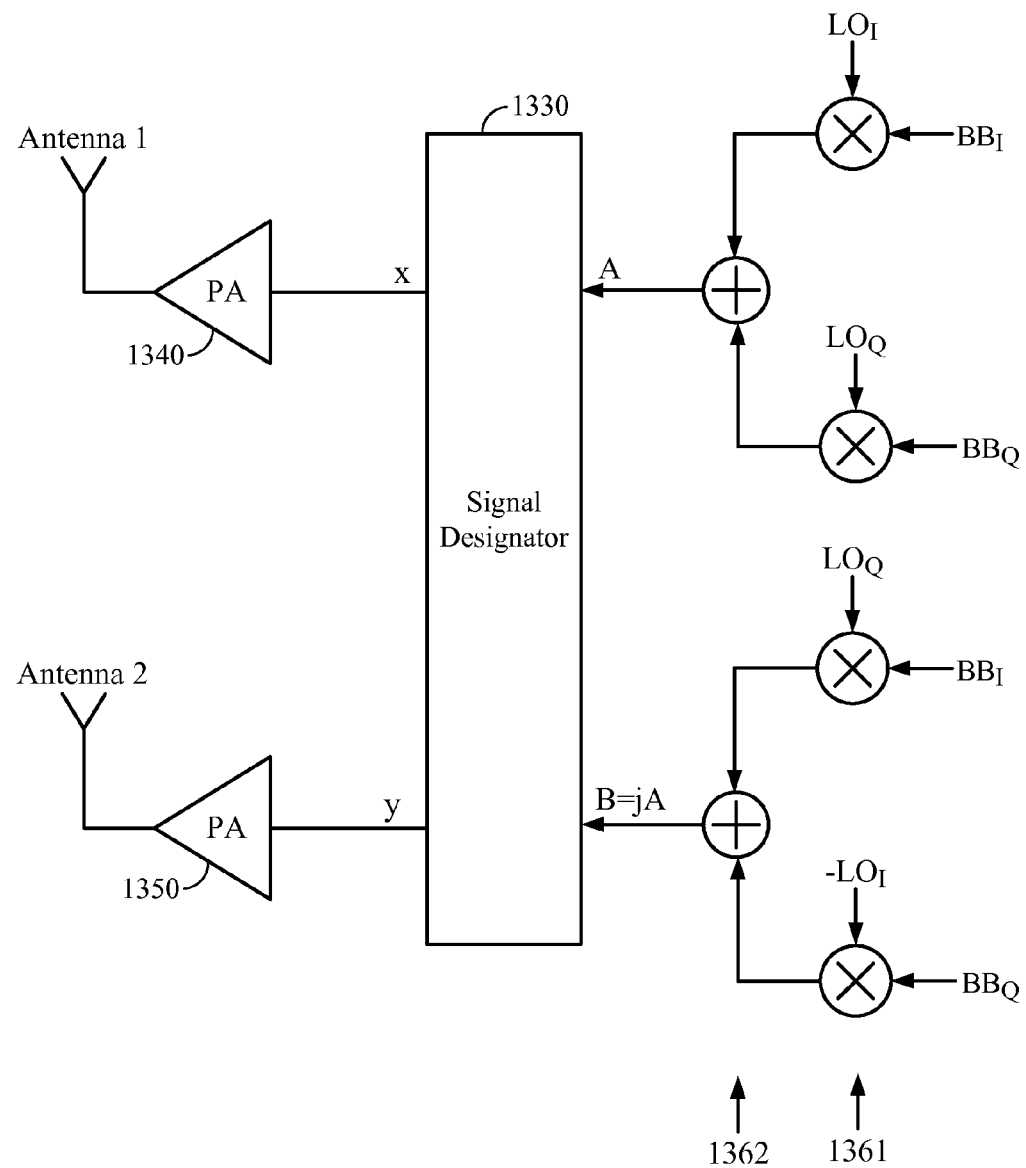
FIG. 13D illustrates an exemplary transmit chain modified for direct conversion.

FIG. 13D illustrates an exemplary transmit chain modified for direct conversion. In this embodiment, baseband signals $BB_I$ and $BB_Q$ are provided to two sets of mixers 1361, wherein one set of mixers mixes baseband signals $BB_I$ and $BB_Q$ with local oscillator signals $LO_I$ and $LO_Q$, respectively, and another set of mixers mixes baseband signals $BB_I$ and $BB_Q$ with local oscillator signals $LO_Q$ and $-LO_I$, respectively. The outputs of each set of mixers are then summed using adders 1362. Adders 1362 output signals A and B, which are then provided to signal designator 1330. Signals x and y, which are output by signal designator 1330, are described as:

(x, y)∈{(A,0), (0,A), (A,A), (−A,A), (A,B), (−A,B)}, which can also be described as:

{(A,0), (0,A), (A,A), (−A,A), (A,jA), (−A,jA)}

Figure 14A:
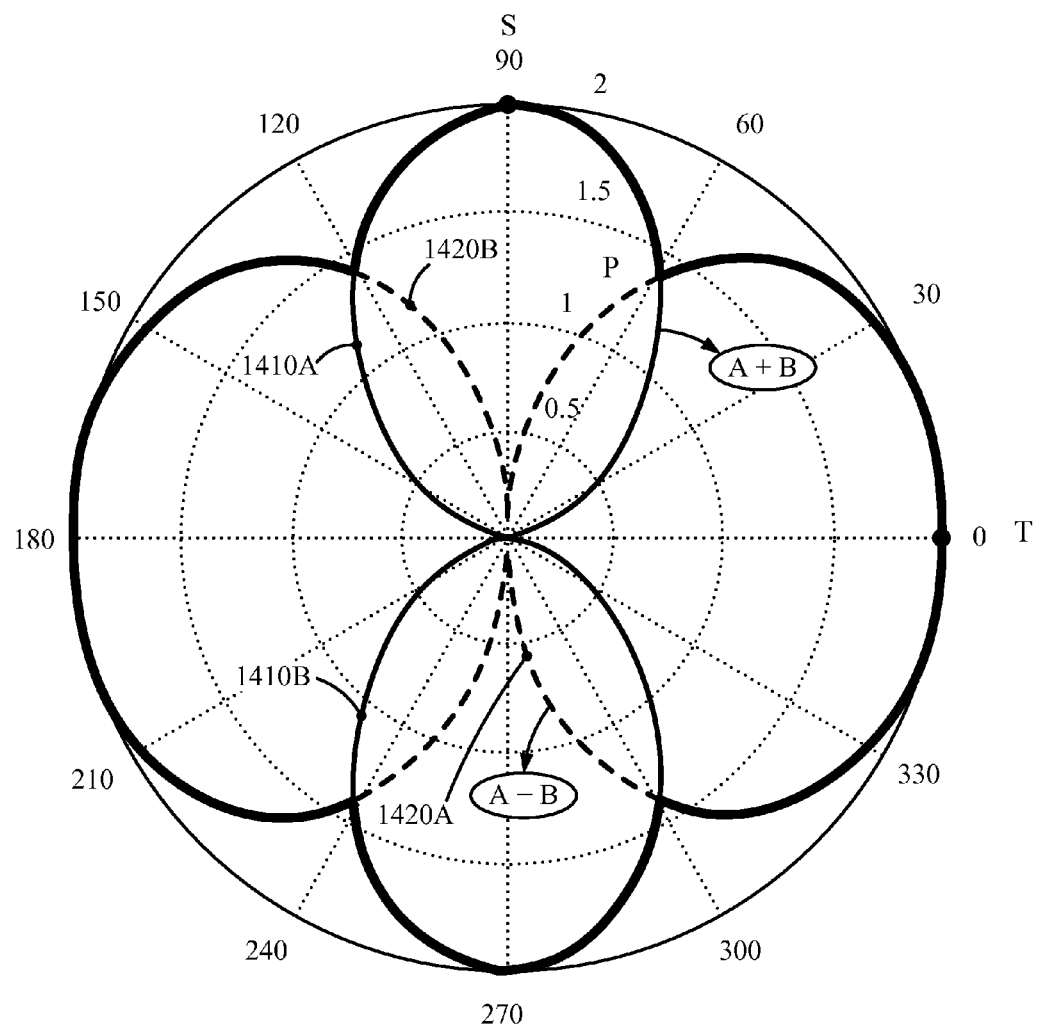
FIG. 14A is a radiation diagram for a pair of antennas configured without the additional mixers shown in FIG. 13A.

FIG. 14A is a radiation diagram for a pair of antennas configured without the additional mixers shown in FIG. 13. The radiation diagram is based on assumptions of antenna omnidirectivity and that a distance between antennas A and B is of a wavelength. A pair of lobes 1410A and 1410B illustrate radiation patterns of antennas A and B (and, conversely, reception sensitivity when receiving signals) for the case of A+B. Lobes 1420A and 1420B illustrate radiation patterns of antennas for the case of A−B. The bold line highlights the outer edges of each of the lobes. The present invention includes programming or other logic that recognizes directivity needed for a signal to be broadcast and directivity strength in received signals. The programming or other logic also selects the most advantageous combination of, +/−A, B, jB, etc., for broadcast or received signals based on that directivity. Therefore, the bold line illustrates the effective radiation pattern of the antenna because the programming and logic allows the best characteristics of each radiation pattern to be taken advantage of.

Figure 14B:
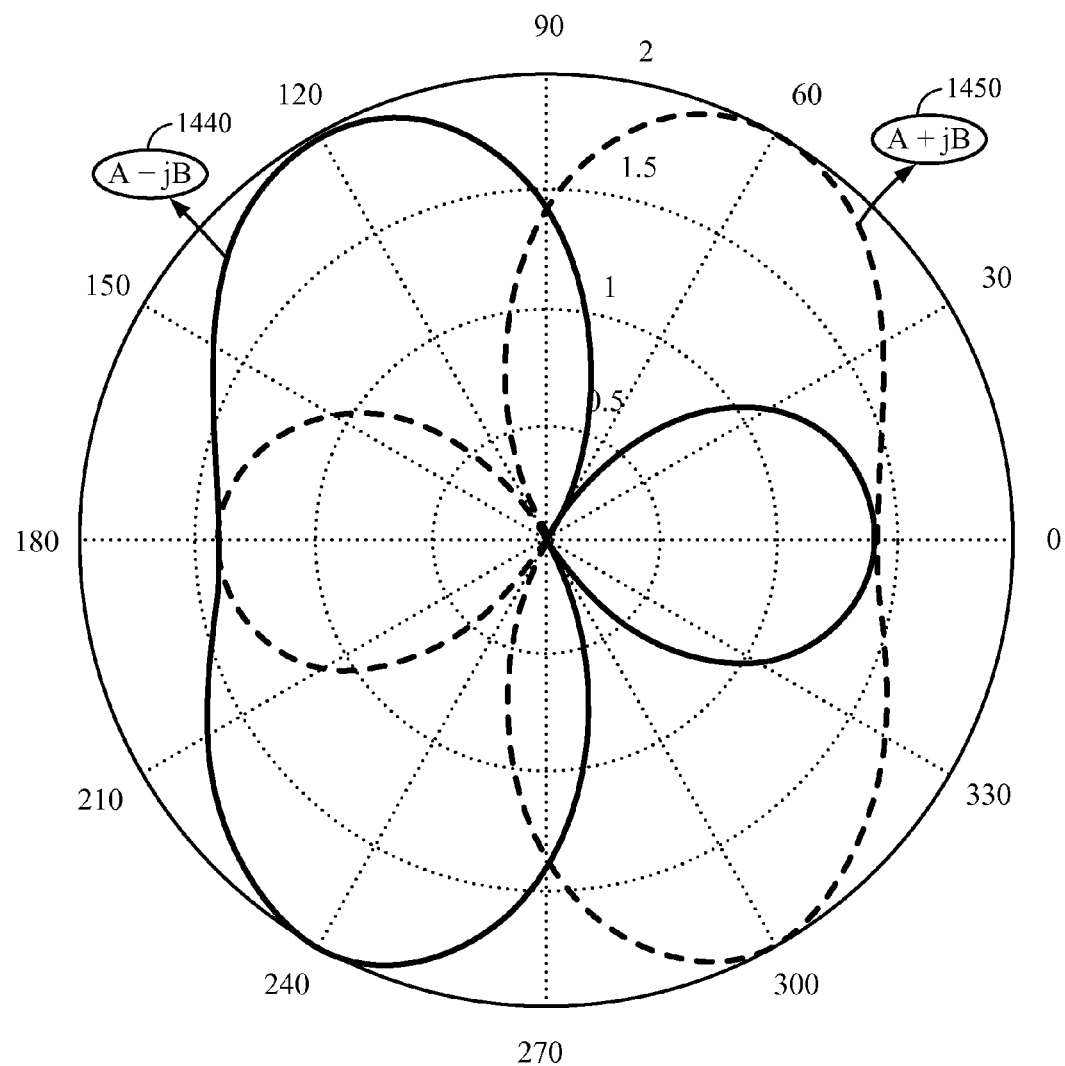
FIG. 14B is a radiation diagram illustrating the jB combinations according to the example implementation of FIG. 13A.
Figure 14C:
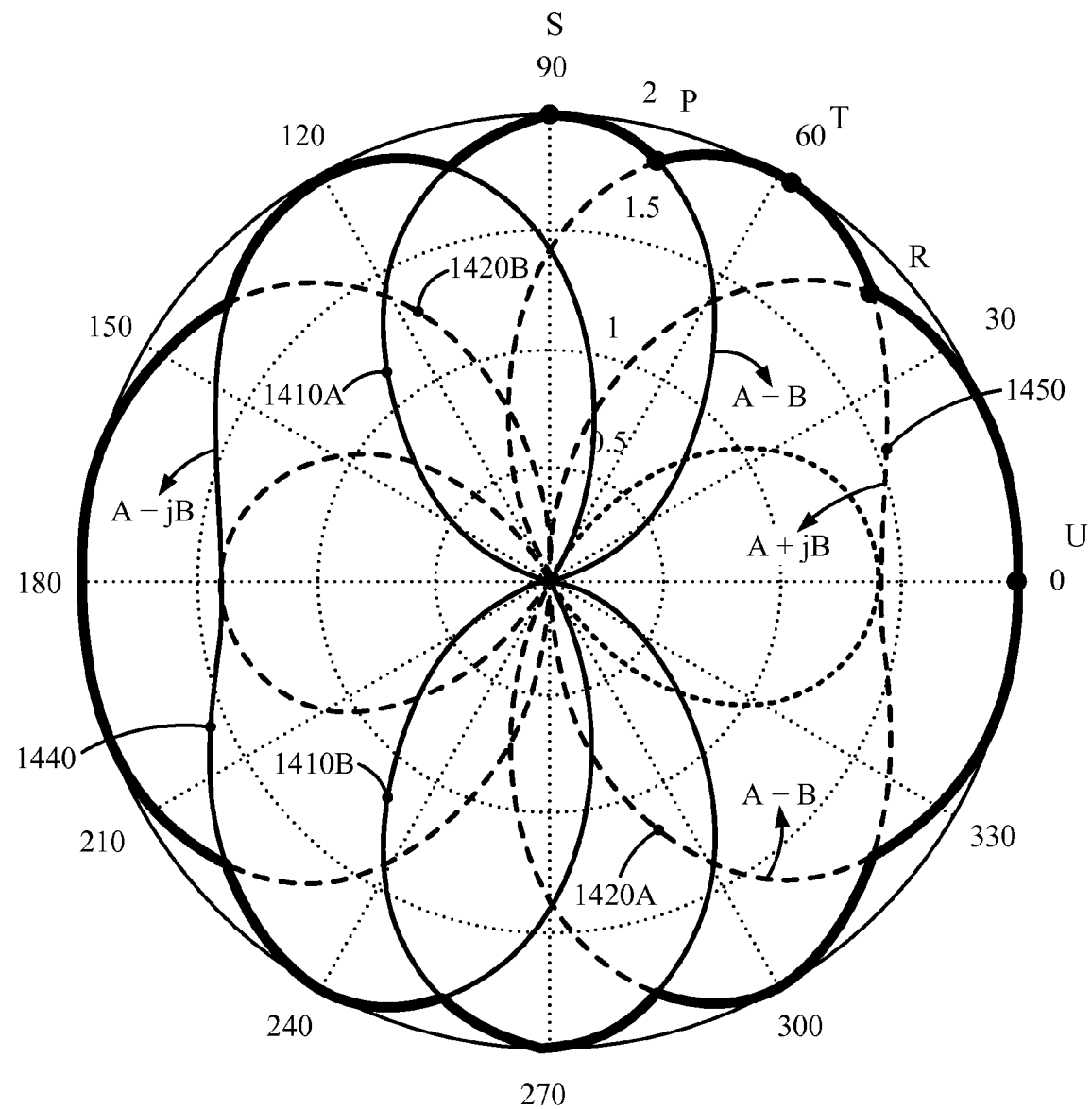
FIG. 14C is an effective radiation diagram combining A+−jb radiation patterns of FIG. 14B with the radiation patterns of FIG. 14A.

By adding more combinations of antenna patterns and including additional programming and or logic to select the additional antenna patterns when needed, the effective radiation pattern of the antennas is further increased. FIG. 14B is a radiation diagram illustrating the jB combinations (B rotated 90°) according to the example implementation of FIG. 13. Lobe 1440 illustrates the A−jB radiation patterns, and lobe 1450 illustrates the A+jB radiation pattern. These additional radiation patterns are added to those illustrated in FIG. 14A, resulting in an effective radiation pattern as shown by the bold line in FIG. 14C.

Figure 15:
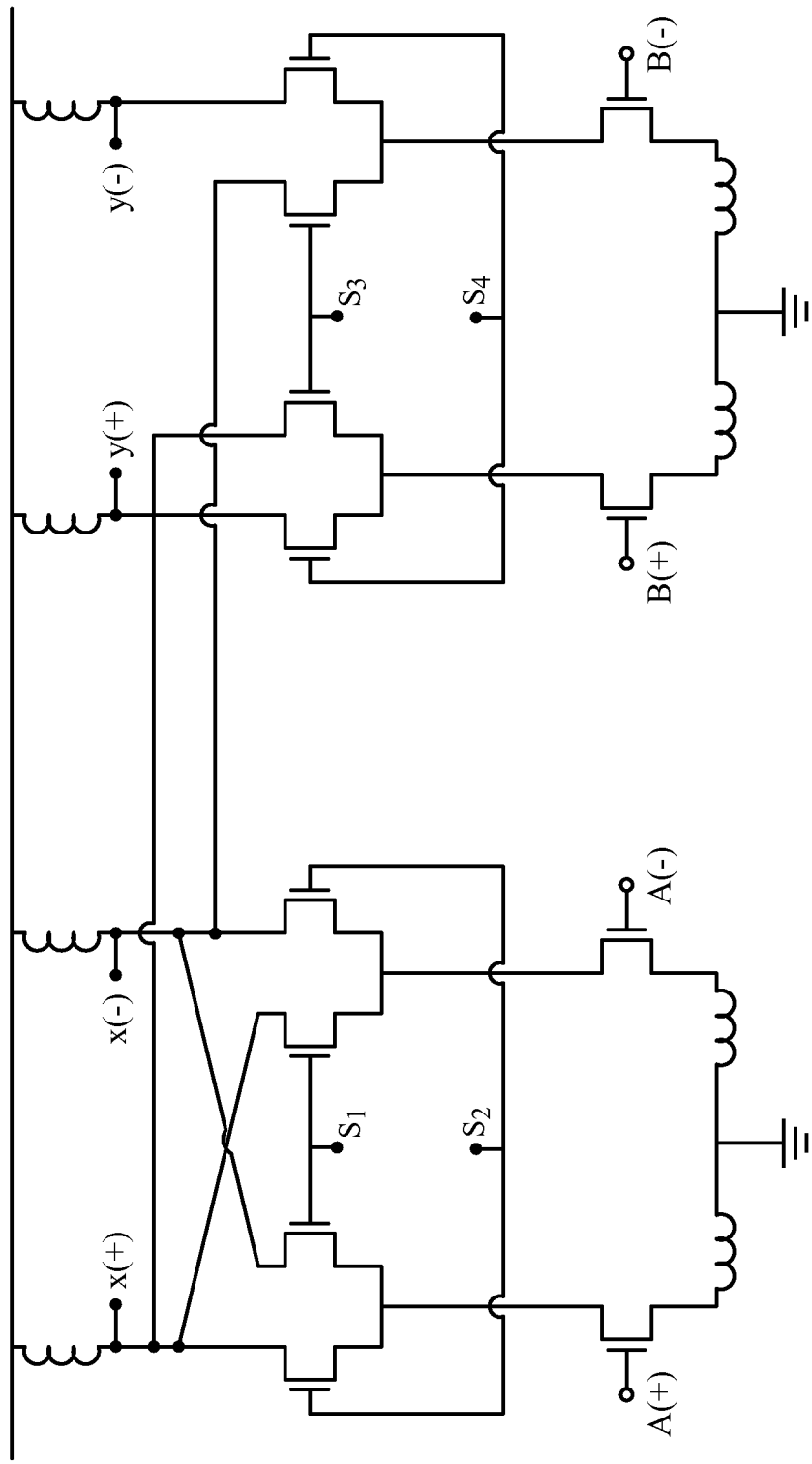
FIG. 15 is an example circuit implementation of the LNAs and 1st combiner from FIG. 13A according to an embodiment of the present invention.

FIG. 15 provides an example circuit implementation of the LNAs and 1st combiner from FIG. 13. Differential amplifier LNA A amplifies signals A(+) and A(−), and LNA B amplifies signals B(+) and B(−). Logic signals S1, S2, S3, and S4 control whether LNA amplified signals A(+), A(−), B(+), or B(−) are applied individually or in combination to differential output signals x(+), x(−), and y(+), y(−). For example, to get an (x, y)=((A−B), 0) from the combiner, logic signals are applied so that $S_1$=1, $S_2$=0, $S_3$=1, and $S_4$=0, therefore, the x differential outputs each have +/−A and −/+B applied to them, resulting in an A−B signal. Table 1 provides a logic chart identifying control signals and outputs for FIG. 15:

TABLE 1

| | $S_1$ | $S_2$ | $S_3$ | $S_4$ | x(+) | x(−) | y(+) | y(−) |
|---|---|---|---|---|---|---|---|---|
| A | 0 | 1 | 0 | 1 | A(+) | A(−) | B(+) | B(−) |
| A − B | 1 | 0 | 1 | 0 | A(−) + B(+) | A(+) + B(−) | 0 | 0 |
| −A | 1 | 0 | 0 | 1 | A(−) | A(+) | B(+) | B(−) |
| A + B | 0 | 1 | 1 | 0 | A(+) + B(+) | A(−) + B(−) | 0 | 0 |
| B | 0 | 0 | 0 | 1 | B(+) | B(−) | 0 | 0 |

Figure 16:
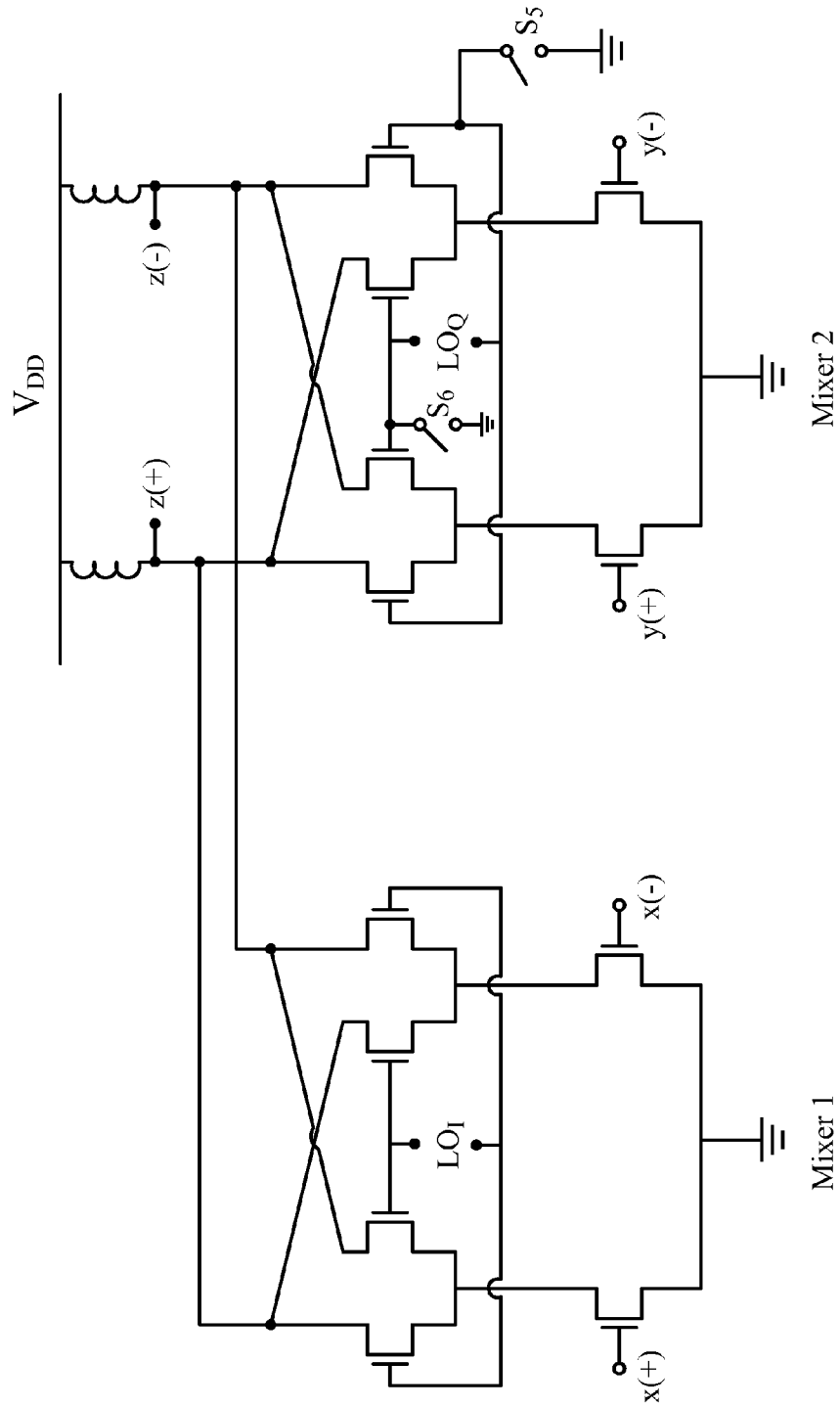
FIG. 16 is a circuit diagram of an example implementation of the mixers M1, M2, and adder of FIG. 13A according to an embodiment of the present invention.

FIG. 16 is a circuit diagram of an example implementation of the mixer 1, mixer 2, and adder of FIG. 13. The topology follows a Gilbert Cell topology, but applied for use in the present invention. Switches $S_5$ and $S_6$ are closed to shut down mixer 2 under the conditions described above.

The present invention also provides an implementation that eliminates off-chip receive/transmit switches. Off-chip diversity and receive/transmit switches are usually implemented as series or shunt switches. Switches are often implemented with diodes or FET transistors. Open series switches and closed shunt switches are ideally lossless terminations and can be used to reflect the signal power and direct it to a desired device. The present invention includes the implementation of on-chip series or shunt switches as a way to eliminate the off-chip devices. Such an implementation saves the cost of the external devices, and lowers the system power consumption in the case that the on-chip devices replace external diode switches, since diodes consume DC power when they are on. More significantly, they can potentially reduce the front-end signal power loss.

The on-chip switches, implemented with FET transistors are not ideal. Their on-resistance is finite, whereas the lossy capacitance of the source and the drain represent some finite resistance to the substrate at high frequency. Parasitic series resistance of on switches is less harmful in terms of power loss when the impedance of the block to which the switch is connected in series is high. Parasitic shunt resistance is less harmful when the impedance of the block to which the switch is connected in series or in shunt is low.

The input of the LNA is usually very sensitive to any lossy components connected to the gate of the input device. If a switch isn't used at the LNA input, when powered down, the LNA possibly represents only a small load to the PA, relative to the load represented by the lossy drain region of the large PA output transistors. However, a good on-chip shunt switch at the PA output can be implemented by using the PA output devices, without the need for new switch devices, which will introduce more losses. Therefore, while in concept this invention would require two on-chip shunt switches, in practice only the PA shunt switch may be needed. However, an advantage may still exist when including both the PA and LNA shunt switches in a design. For example, large amounts of power transmitted by the PA may have enough power leakage to the LNA that the LNA may be in danger of being damaged. In this case, the LNA shunt switch would help prevent damage.

Figure 10:
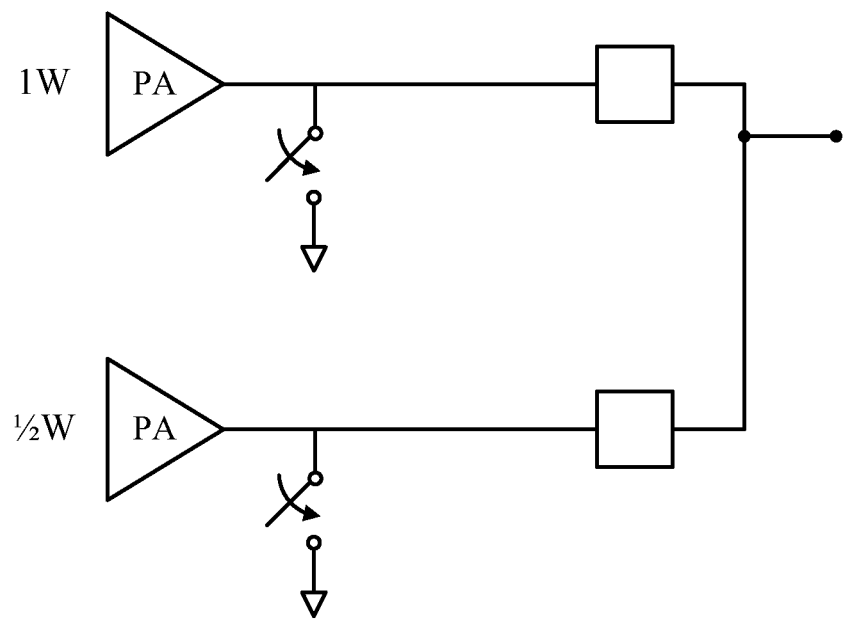
FIG. 10 is a prior art implementation of a switchable power combiner using parallel shunt PA devices.

FIG. 10 is a prior art implementation of switchable power combiner using parallel devices. Each of a dual PA arrangement includes a shunt switch that grounds the unused PA output. This basic idea can be extended to transmit/receive switches.

The present invention leverages from the switchable power combiner in FIG. 10 to provide an improved transmit/receive switch arrangement for associating a PA or a LNA to an antenna.

Figure 11:
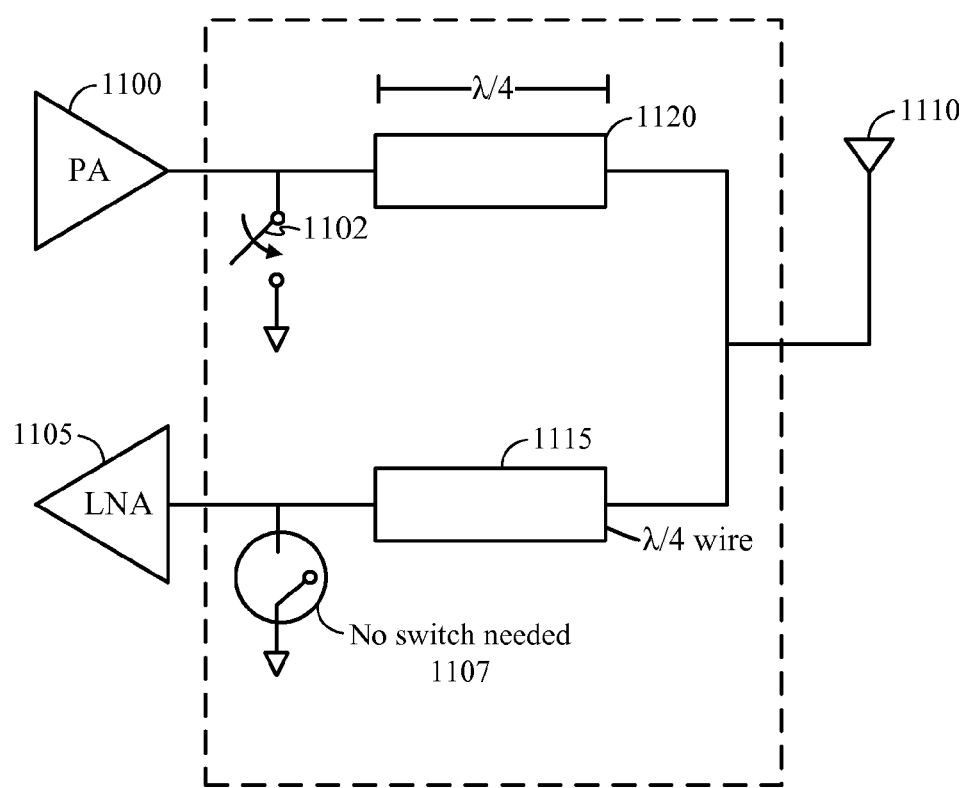
FIG. 11 is a block diagram of a transmitter PA and a receiving LNA operating with shunt switches in conjunction with a single antenna according to an embodiment of the present invention.

FIG. 11 is a block diagram of a transmitter PA 1100 and a receiving LNA 1105 operating without external switches in conjunction with a single antenna 1110. Each of the components are coupled to a ¼ wavelength wires or equivalent networks 1115 and 1120. Note that no grounding switch for the LNA 1105 is needed.

FIG. 11 exploits a property of ¼ wavelength wires that a short circuit on one end of the wire appears as an open circuit at the other end. In the circuit shown, during receive, the shunt switch 1102 on the transmit (PA) side is shorted to ground. This causes the other end of wire 1120 to appear as an open circuit, and thus the received signal is coupled from the antenna 1110 to the LNA 1105 with a minimum of loss onto the transmit circuitry. Thus, the shunt switch 1102 is opened during transmit and closed during receiving. The shunt switch 1102 is operated via circuitry and/or programming.

The same principle applies during transmit mode, when signals coupled from the PA 1100 to the antenna 1110 with a minimum of loss into the receive circuitry. In concept, this is accomplished by placing a shorted switch 1107 on the LNA side of wire 1115. In practice, the present inventors have found that the loss of signal power during transmit is minimal, and may not require switch 1107 at the LNA input. This is due to the relatively small input capacitance of the LNA (in this implementation). Also, since the presence of a switch at the LNA input would degrade the receiver performance (even when the switch is open), the preferred implementation of FIG. 11 uses only the single shunt switch 1102 at the output of the PA 1110.

Individuals skilled in the art of RF design can replace the ¼ wavelength lines with equivalent lump element circuits or matching networks.

Figure 12:
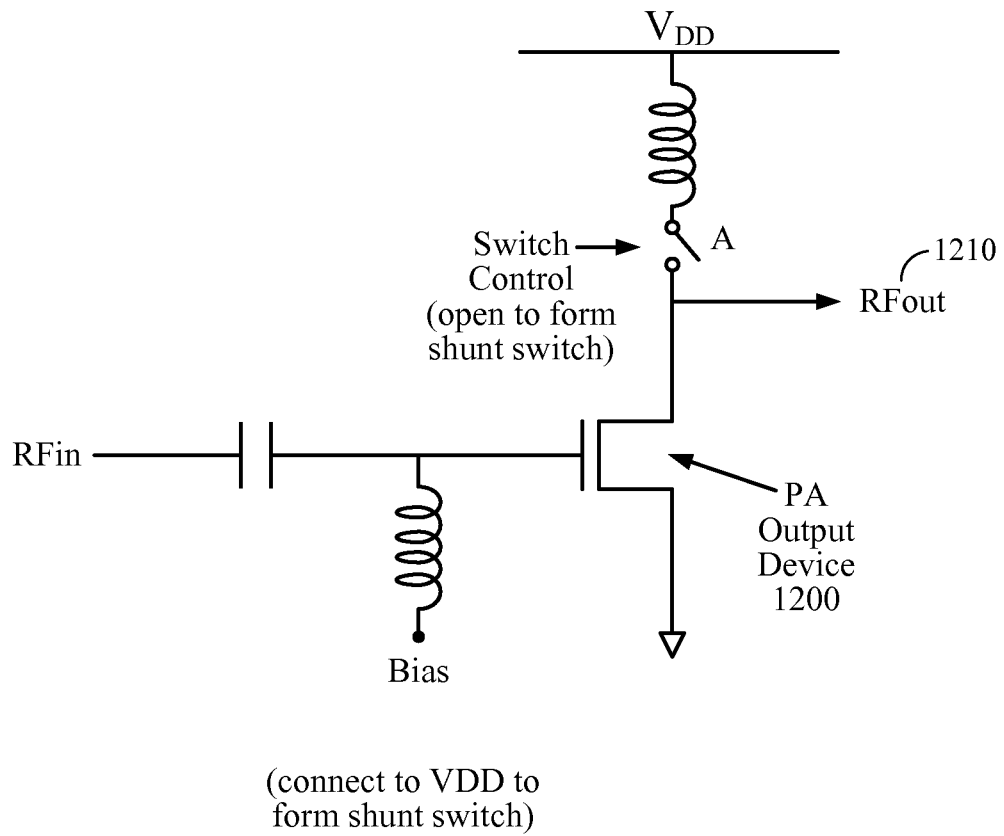
FIG. 12 is an example implementation of a PA with a built-in shunt switch according to an embodiment of the present invention.

FIG. 12 is an example implementation of a PA with a built-in shunt switch according to an embodiment of the present invention. With reference to FIG. 12, the following operations are performed:

During Transmit, the PA output device 1200 delivers power to the antenna Rfout 1210. Switch A is closed so that the DC current is provided to the PA output device 1200. Bias is set at a DC voltage appropriate for amplifying the input RF signal.

During Receive, the shunt switch is active, and no DC power should be consumed. Switch A is open to disconnect DC power from the PA output device. Bias is connected to VDD so that the PA output device 1200 forms a shunt-switch to ground. Note that switch A can either be placed between the inductor and PA device 1200 as shown in FIG. 12 or between the inductor and supply VDD.

Although the present invention has been described herein with reference to two diversity antennas, any number of antennas may be accommodated by adding additional circuits and/or other hardware as described herein, which will be apparent to the ordinarily skilled artisan based upon review of the present disclosure.

The present invention is intended to be applicable to any range of frequencies and numerous antenna combinations. In one embodiment, an RF front end according to the present invention is configured for IEEE 802.11a wireless communications. In another embodiment, the RF front end is configured for 802.11b wireless communications. In yet another embodiment, diversity antennas are utilized in an 802.11a and 802.11b combined radio device. Either the antennas themselves are dual band antennas, or the one or more of the antennas attached to the RF front end are specifically for 802.11a communications and one or more other of the antennas attached to the RF front end device are specifically for 802.11b communications. Again, however, any combination protocols or broadcast frequencies may be supported by the devices and processes elaborated herein.

In describing preferred embodiments of the present invention illustrated in the drawings, specific terminology (e.g., component values, transistor types, differential design, etc.) is employed for the sake of clarity. However, the present invention is not intended to be limited to the specific terminology so selected, and it is to be understood that each specific element includes all technical and design equivalents which operate in a similar manner. For example, when describing power amplifier and combination of electrical components, including, but not limited to, transistors, resistors, capacitors, etc. may be employed in making that part, and, any other device having an equivalent function or capability, whether or not listed herein, may be substituted there-with. Furthermore, the inventors recognize that newly developed technologies not now known may also be substituted for the described parts and still not depart from the spirit and scope of the present invention. All other described items, including, but not limited to LNAs, Splitters, combiners, switches, and antennas, etc should also be consider in light of any and all available equivalents.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any one or more processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, setting of switches, (e.g., diversity switches, transmit/receive switches, etc.), setting PA amplification levels, packet testing, signal strength evaluation, software mixing, combining, or other functions to implement any aspect of the present invention.

Numerous modifications and variations of the present invention are possible in light of the above teachings. It is therefore to be understood that within the scope of the appended claims, the invention may be practiced otherwise than as specifically described herein.

The invention claimed is:

1. An RF front end of a transmit chain providing direct conversion, the RF front end comprising:
a plurality of sets of mixers, each mixer set receiving I and Q components of an input signal and a local oscillator (LO) signal;
wherein the plurality of sets of mixers are first and second sets of mixers, the first set of mixers receiving an I component and a Q component of the LO signal and the second set of mixers receiving an –I component and the Q component of the LO signal,
a plurality of adders, each adder receiving inputs from one set of mixers;
a signal designator for receiving summed signals from the plurality of adders and selecting designated output signals;
a plurality of power amplifiers (PAs), each PA receiving a designated output signal from the signal designator; and
a plurality of antenna ports, each antenna port receiving an amplified signal from one of the plurality of PAs.

2. An RF front end of a transmit chain providing direct conversion, the RF front end comprising:
a plurality of sets of mixers, each mixer set receiving I and Q components of an input signal and a local oscillator (LO) signal;
a plurality of adders, each adder receiving inputs from one set of mixers;
wherein the plurality of adders are first and second adders,
wherein the first adder receives a first mixed signal resulting from mixing an I component of the input signal and an I component of the LO signal and a second mixed signal resulting from mixing a Q component of the input signal and a Q component of the LO signal, and
wherein the second adder receives a third mixed signal resulting from mixing the I component of the input signal and the Q component of the LO signal and a fourth mixed signal resulting from mixing the Q component of the input signal and an –I component of the LO signal,
a signal designator for receiving summed signals from the plurality of adders and selecting designated output signals;
a plurality of power amplifiers (PAs), each PA receiving a designated output signal from the signal designator; and
a plurality of antenna ports, each antenna port receiving an amplified signal from one of the plurality of PAs.

3. An RF front end of a transmit chain providing direct conversion, the RF front end comprising:
a plurality of sets of mixers including first set and second set of mixers, wherein the first set of mixers receives an I component and a Q component of a local oscillator (LO) signal and the second set of mixers receives a –I component and the Q component of the LO signal;
a plurality of adders including first and second adders,
wherein the first adder receives a first mixed signal resulting from mixing an I component of the input signal and the I component of the LO signal and a second mixed signal resulting from mixing a Q component of the input signal and the Q component of the LO signal, and
wherein the second adder receives a third mixed signal resulting from mixing the I component of the input signal and the Q component of the LO signal and a fourth mixed signal resulting from mixing the Q component of the input signal and the –I component of the LO signal; and
a signal designator for receiving summed signals from the plurality of adders and selecting designated output signals;
a plurality of power amplifiers (PAs), each PA receiving a designated output signal from the signal designator; and
a plurality of antenna ports, each antenna port receiving an amplified signal from one of the plurality of PAs.

* * * * *